United States Patent [19]

Iyoda

[11] Patent Number: 5,390,951
[45] Date of Patent: Feb. 21, 1995

[54] OPERATION CONTROL SYSTEM FOR VEHICULAR AIR BAG SYSTEM

[75] Inventor: Motomi Iyoda, Seto, Japan

[73] Assignee: Toyota Jidosha Kabushiki Kaisha, Toyota, Japan

[21] Appl. No.: 79,380

[22] Filed: Jun. 21, 1993

[30] Foreign Application Priority Data

Jun. 22, 1992 [JP] Japan .................. 4-187485
Dec. 25, 1992 [JP] Japan .................. 4-359506
May 31, 1993 [JP] Japan .................. 5-152750

[51] Int. Cl.$^6$ .................................. B60R 21/22
[52] U.S. Cl. .................. 280/730 A; 280/735; 180/274; 180/282; 340/436
[58] Field of Search ............ 280/730 A, 734, 735; 180/274, 279, 282; 307/10.1, 121; 340/436

[56] References Cited

U.S. PATENT DOCUMENTS

| | | | |
|---|---|---|---|
| 3,774,151 | 11/1973 | Lewis et al. | 180/274 |
| 3,889,232 | 6/1975 | Bell | 280/735 |
| 4,366,465 | 12/1982 | Veneziano | 180/271 |
| 4,958,851 | 9/1990 | Behr et al. | 280/735 |
| 5,170,066 | 12/1992 | Huber | 280/735 |
| 5,222,761 | 6/1993 | Kaji et al. | 280/730 A |
| 5,283,472 | 2/1994 | Takeuchi et al. | 280/735 |
| 5,322,323 | 6/1994 | Ohno et al. | 280/735 |

FOREIGN PATENT DOCUMENTS 90006247 6/1990 European Pat. Off. .
1368899 10/1974 United Kingdom .

OTHER PUBLICATIONS

Patent Abstract of Japan, vol. 16 No. 11 (M-1223d)(5154) Mar. 1992 re JP-A 3281459.

Primary Examiner—Kenneth R. Rice
Assistant Examiner—Paul N. Dickison
Attorney, Agent, or Firm—Cushman, Darby & Cushman

[57] ABSTRACT

An operation control system to be used with a vehicular air bag system having an air bag and an inflator comprises an inhibit circuit for preventing a useless expansion of the air bag and inhibiting the later operation of the air bag by detecting that a touch sensor already has its contacts closed, when the ignition switch acting as a main switch for an igniting circuit of the squib of the inflator is switched from OFF to ON, if the contacts of the touch sensor are closed when the ignition switch is OFF. Also comprised is an acceleration type collision sensor acting as a second collision sensor for causing the air bag to be expanded if an acceleration detected exceeds a predetermined level, even if in the inhibited state by the inhibit circuit. Further comprised are a timer for releasing the inhibited state by the inhibit circuit after the state has been held for a predetermined time period, and a unit for releasing the inhibited state if there is detected a vehicular state in which the air bag can be operated.

8 Claims, 17 Drawing Sheets

OPERATION CONTROL SYSTEM FOR VEHICULAR AIR BAG SYSTEM

BACKGROUND OF THE INVENTION

The present invention relates to an air bag system for protecting a vehicular occupant against the impact of a collision by feeding gases to inflate an air bag, when the collision is detected, so that the air bag may be expanded between the occupant and a structural component of the vehicle compartment to establish an impact buffing zone. More particularly, the present invention relates to an operation control system for the vehicular air bag system, which includes means for preventing the air bag from being expanded, if unnecessary as at the time of a non-collision.

In a vehicle equipped with an air bag system for a vehicular side collision, there is a technology of arranging the side door with a touch sensor for detecting a side collision of the vehicle. The side door of the vehicle equipped with the side collision air bag system is disclosed in Japanese Patent Laid-Open No. 281459/1991, for example. In order to detect a side collision quickly, as shown in FIG. 22, a collision sensor 3 is attached to the outer side (as located at the lefthand side of FIG. 22) of a side impact beam 2 arranged generally horizontally in a side door 1 and is positioned close to the inner face of the outer panel 4 of the side door 1.

This collision sensor 3 has its contacts connected, if it is clamped between the outer panel 4 to be deformed inward at the time of a side collision of the vehicle and the side impact beam 2. If the collision sensor 3 thus detects the side collision, an inflator 5 is fed with an igniting current so that it is ignited. The ignited inflator 5 produces inert gases to inflate an air bag 7 which is confined in a folded state in an arm rest 6, for example, so that the air bag 7 is expanded between the inner face of the side door 1 in the compartment and the occupant thereby to protect the occupant from a secondary collision.

In the side collision air bag system, as described above, the collision sensor 3 is often arranged close to the inner face of the outer panel 4 in the side door 1 so as to detect the side collision quickly. Thus, the outer panel 4 may be deformed to turn ON the collision sensor 3 at the time other than the side collision if a considerable force is applied to the outer side of the side door 1.

Especially the collision sensor of touch switch type is held to have closed contacts, once it is compressed to have its contacts closed as a result of a plastic deformation of the outer panel 4. Let the case be considered, in which an external force is applied to the side door 1 of a vehicle being parked with no passenger so that the outer panel 4 is plastically deformed to close the contacts of the collision sensor 3. At this instant, the air bag is left unexpanded because the ignition switch (i.e., the main switch of the vehicle) is OFF. When the driver turns ON the ignition switch for starting the vehicle, there arises a disadvantage that the inflator igniting circuit is made to expand the air bag because the contacts of the collision sensor 3 are closed.

SUMMARY OF THE INVENTION

A main object of the present invention is to prevent an unnecessary expansion of an air bag at the time of a non-collision.

Another object of the present invention is to prevent the malfunction of an air bag system while the voltage is unstable immediately after the vehicle is supplied with the electric power.

A further object of the present invention is to release the inhibited state of the air bag when a predetermined vehicle state for the operation of the air bag is detected, even if the air bag system is in its operated inhibited state.

As shown in FIGS. 1A to 1C, an operation control system for a vehicular air bag system according to the present invention comprises: an air bag AB for being expanded with fed gases to establish an impact buffing zone between a vehicular occupant and a structural component of a vehicle compartment; a collision sensor CS for detecting a deformation of the vehicle body at the time of a collision of the vehicle; an inflator IF for producing the gases, if energized and ignited, to feed the same to the air bag; a main switch MS for feeding an operating current to the inflator; and inhibit means IM for inhibiting the operation of the inflator if the collision sensor has its contacts closed when the main switch is OFF. The operation control system comprises an acceleration sensor GS, as shown in FIG. 1B.

Further comprised are: a timer for holding the operation inhibited state of the inflator IF by the inhibit means IM for a predetermined time period after the main switch of the vehicle has been turned ON and for releasing the inhibited state; and inhibition release signal output means CM for outputting an inhibition release signal to release the inhibited state of the inflator by the inhibit means IM, if a predetermined vehicle state is detected.

The inhibition release signal output means is exemplified by a unit such as an alternator or an engine tachometer capable of detecting the driving state of the engine, a unit such as a speed meter or a speed responding door lock mechanism capable of detecting the running state of the vehicle, or a unit in a vehicle having an automatic transmission, for example, such as a shift position indicator capable of detecting that the shift position is other than the parking range.

The above and features objects and novel feature of the invention will more fully appear from the following detailed description when the same is read in connection with the accompanying drawings. It is to be expressly understood, however, that the drawings are for the purpose of illustration only and are not intended as a definition of the limits of The invention.

DETAILED DESCRIPTION OF THE PREFERRED EMBODIMENTS

Here will be described the present invention in connection with its embodiments.

Figure 1A:
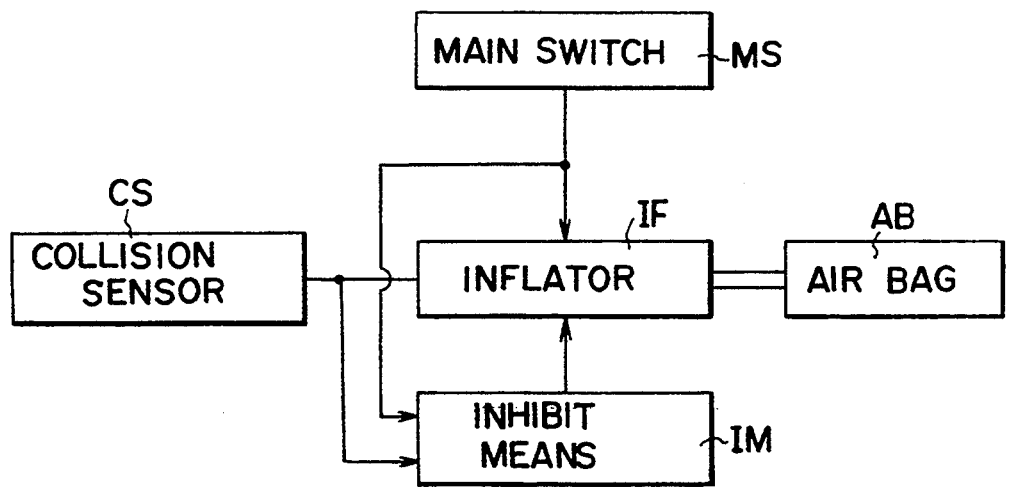
FIGS. 1A to 1C present block diagrams illustrating the controls of control systems according to the present invention, respectively.
Figure 1B:
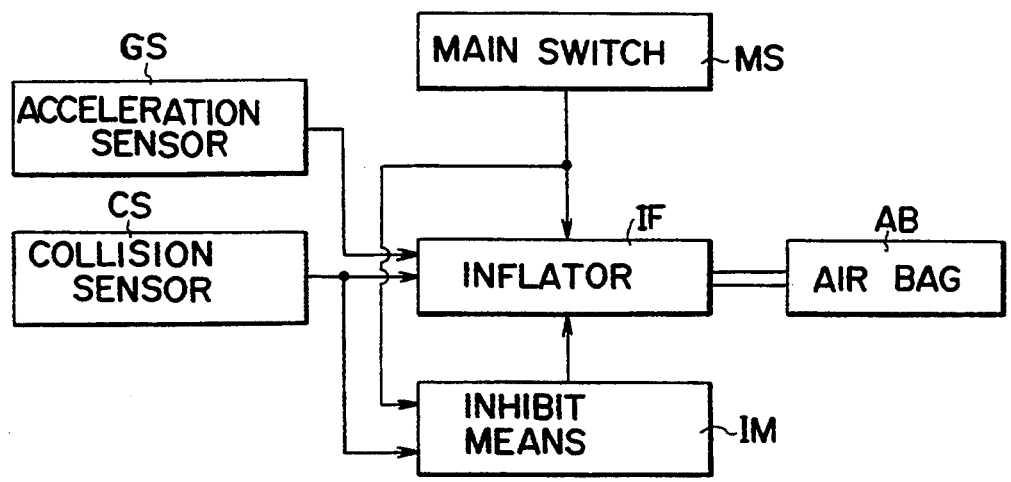
Figure 1C:
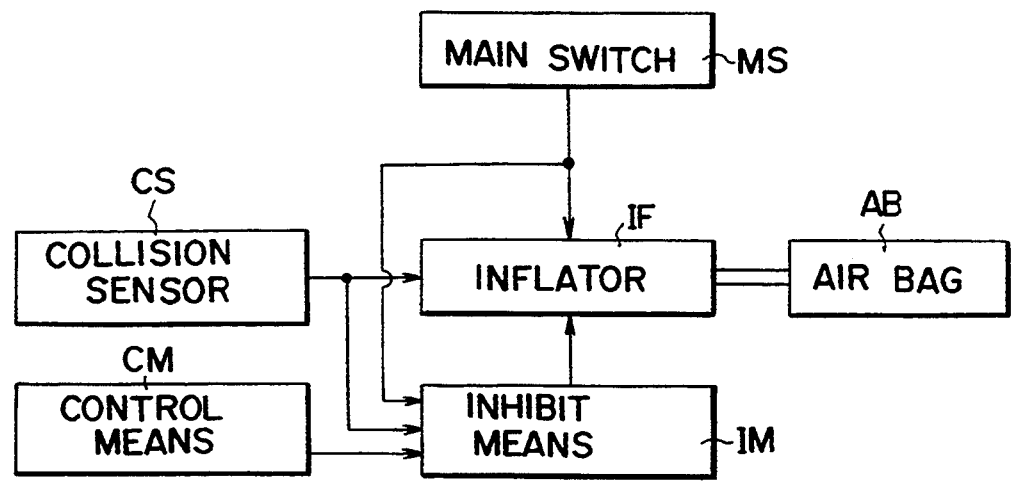
Figure 2:
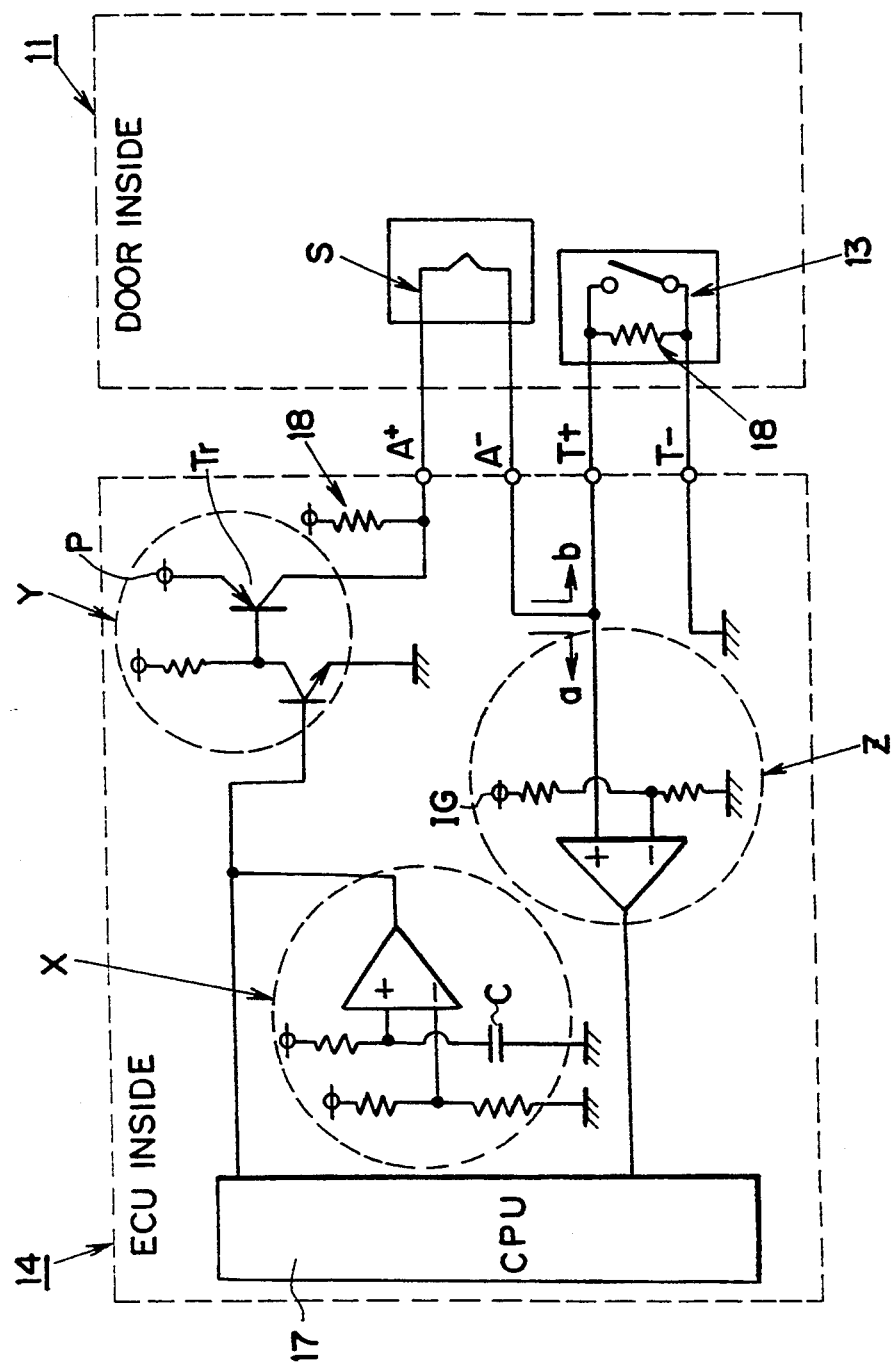
FIG. 2 is a circuit diagram showing the construction of an air bag operation control system according to a first embodiment of the present invention.
Figure 3:
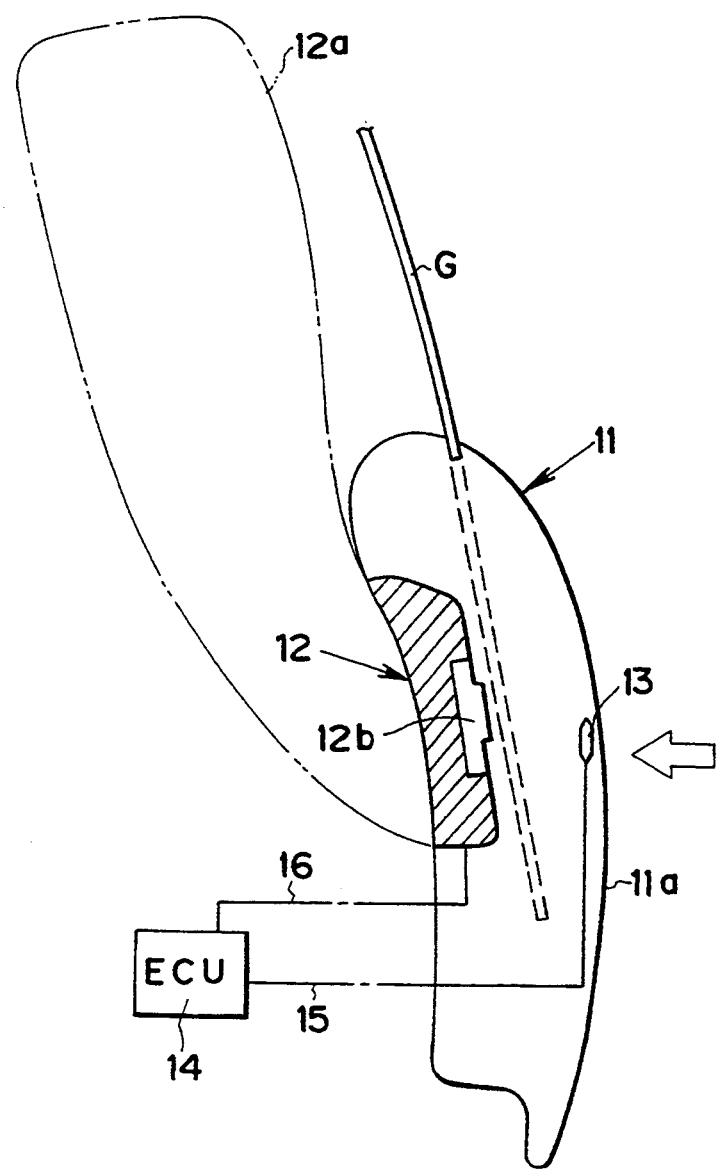
FIG. 3 is an explanatory diagram showing the construction of the air bag system of the first embodiment.

FIGS. 2 to 4 show a first embodiment of an operation control system for a vehicular air bag system according to the present invention. On the inner side (as located at the lefthand side of FIG. 3) of the inside of a vehicle side door 11, there is supported by the door inner panel (although not shown) an air bag module 12 in which are confined an air bag 12a in a folded state and an inflator 12b for inflating the air bag 12a. In the vicinity of the inner face of a door outer panel 11a in the side door 11, moreover, there is arranged a touch sensor 13 acting as a collision sensor for detecting a side collision mechanically. The touch sensor 13 is supported by a structural member of the side door 11 and is connected through a lead wire 15 with an air bag operation control unit (ECU) 14 arranged close to the center of the vehicle body. The air bag operation control unit 14 is connected through a lead wire 16 with a squib S of the inflator 12b of the air bag module 12.

In the air bag operation control unit 14, as shown in FIG. 2, there are packaged: a microcomputer (CPU) 17; an inhibition hold circuit X for inhibiting the air bag operation for a predetermined time period (of several milliseconds) of unstable operations at the rising time of the microcomputer 17 immediately after an ignition switch IG is turned ON from OFF; an inhibit circuit Y for inhibiting the air bag operation and lighting a warning lamp (although not shown) on the instrumental panel in response to an ON signal, if any from the touch sensor 13, when the ignition switch IG is turned ON from OFF; and a comparator Z for detecting whether the touch sensor 13 is ON or OFF.

On the other hand, the air bag operation inhibit circuit Y does not inhibit the operation of the side air bag system but allows the ordinary air bag operation, if the ON signal output from the touch sensor 13 is not detected by the comparator Z when the ignition switch IG is turned ON from OFF. Thus, if a side collision is detected after the ignition switch IG is turned ON, an ignition signal or current is fed to the squib S of the inflator 12b of the air bag module 12 to ignite the gas producing agent in the inflator 12b so that the air bag 12a is inflated and expanded to a predetermined position by the produced gases.

Moreover, the inhibit circuit Y is disposed midway of the wiring line connecting the squib S in the inflator 12b of the air bag module 12 and a power supply P, and the inhibition hold circuit X is connected between the inhibit circuit Y and the microcomputer 17. Still moreover, the comparator Z is disposed midway of the wiring line connecting the microcomputer 17 and the touch sensor 13 in the side door 11. On the other hand, the squib S has its minus terminal connected with the plus terminal of the touch sensor 13, whose minus terminal is earthed to the vehicle body. Incidentally, reference numeral 18 appearing in FIG. 2 designates a diagnosis resistor.

Here will be described the operations of the comparator Z. First of all, the touch sensor 13 is normally fed with electric currents, as indicated by arrows a and b in FIG. 2, by the action of the diagnosis resistor 18. As a result, the comparator Z has its plus terminal fed with the signal of high level and outputs the high-level signal to the microcomputer 17.

If the touch sensor 13 is turned ON, the signal of low level is input to the plus terminal of the comparator Z, from which is outputted the low-level signal to the microcomputer 17. With these operations, the microcomputer 17 detects the ON/OFF state of the touch sensor 13 in terms of the level of the output signal of the comparator Z.

Here will be described the operations of the inhibit circuit Y. When the microcomputer 17 or the inhibition hold circuit X outputs the low-level signal, the transistor Tr is OFF so that the squib S of the inflator 12b is not energized. When both the microcomputer 17 and the inhibition hold circuit X output the high-level signal, the transistor Tr is turned ON. If, in this state, the touch sensor 13 is turned ON, the inflator 12b has its squib S energized and ignited so that the air bag 12a is expanded by the gas produced.

Here will be described the operations of the inhibition hold circuit X. Since the voltage grows unstable when the ignition switch IG is closed, the operations of the microcomputer 17 become unstable. Then, microcomputer 17 may output not the low-level signal but the high-level signal even though the touch sensor 13 has its contacts closed. In order to prevent this malfunction of the microcomputer 17, therefore, the predetermined time period till a capacitor C is charged up is determined such that the transistor Tr of the inhibit circuit Y is turned OFF by setting the plus terminal of the comparator to the low level to output the low-level signal From the comparator of the inhibition hold circuit X. Thus, the transistor Tr is not turned ON for the predetermined time period required for the capacitor C to be charged up. As a result, the air bag operation is inhibited independently of the ON/OFF state of the touch sensor 13 for the predetermined time period (till the capacitor C is charged UP) immediately after the ignition switch IG is turned ON. Incidentally, the time period for holding the inhibited state of the air bag operation is determined depending upon the magnitude of the capacity of the capacitor C and the value of the series resistor.

Here will be described the operations of this embodiment thus constructed. If the driver switches the ignition switch IG from OFF to ON so as to start the vehicle, the power-on timer (for charging the capacitor C) of the inhibition hold circuit X is started to hold the inhibited state of the air bag operation by the inhibit circuit Y for the predetermined time period till the microcomputer 17 has its operation stabilized.

As a result, the inhibited state is held to keep the air bag inoperative, and the current to the squib S of the inflator 12b is blocked until the power-on timer is matured, not only if the input to close the contacts of the touch sensor 13 is absent when parked in which the ignition switch IG is OFF or inconductive, but also even if the touch sensor 13 has its contacts closed when parked by a kick or mischief or even if the comparator Z detects the ON signal which is issued when the touch sensor 13 has its contacts closed or is turned ON by an external force applied during the operation of the power-on timer as a result of the ON of the ignition switch IG.

Moreover, when the power-on timer is matured, the comparator Z does not detect the ON signal if the contacts of the touch sensor 13 are not closed with the ignition switch IG being OFF. As a result, the inhibited state by the inhibit circuit Y is released because of no malfunction, and this released state is held so that the air bag system functions normally. If the touch sensor 13 is turned ON by an external force due to a collision or the like against the vehicle side while the ignition switch IG is ON during the running of the vehicle, the electric current is fed to the squib S of the inflator 12b of the air bag module 12 through the transistor Tr of the inhibit circuit Y. As a result, the squib S is ignited so that the inflator 12b produces nitrogen gas. This nitrogen gas expands the air bag 12a confined in the peripheral wall portion in the compartment, to protect the occupant against a secondary collision.

Moreover, in case the contacts of the touch sensor 13 are closed with the ignition switch IG being OFF or in case the touch sensor 13 is turned ON while the power-on timer is still in operation immediately after the ignition switch IG is turned ON, the inhibited state by the inhibit circuit Y is held even if the power-on timer of the inhibition hold circuit X is matured. When the inhibited state of the air bag operation is thus held, the driver is informed of the malfunction individually by lighting the warning lamp on the instrumental panel or acoustically by a buzzer or a spoken notice.

In case, moreover, the malfunction of the air bag system is noticed by the warning lamp or the buzzer, the outer panel may preferably be repaired in the service shop before the vehicle is reused. Incidentally, this repair does not require the replacement of the air bag module 12 because the air bag has not been expanded.

In this embodiment, the inhibition hold circuit X is disposed in the air bag operation control unit 14 to prevent the malfunction for the unstable period at the rising time of the microcomputer 17 immediately after the ignition switch IG is switched from OFF to ON. Despite of this arrangement, however, the inhibition hold circuit X can be omitted in case the time period required for the check of the ignition circuit to be carried out immediately after the power supply is sufficiently shorter than the time period (of about 3 milliseconds) necessary for igniting the squib S.

Moreover, this embodiment has been described in case the ignition switch IG is used as an example of the main switch. However, a seat sensor may be disposed in the seat to energize the ignition circuit electrically only while the occupant is seated, so that the air bag 12a may be expanded only at the side of the seat of the occupant while being left unexpanded at the side of an unoccupied seat.

Incidentally, the individual constructions of the inhibition hold circuit X, the inhibit circuit Y and the comparator Z used in this embodiment are presented merely for exemplifications and should not be limited thereto.

Figure 4A:
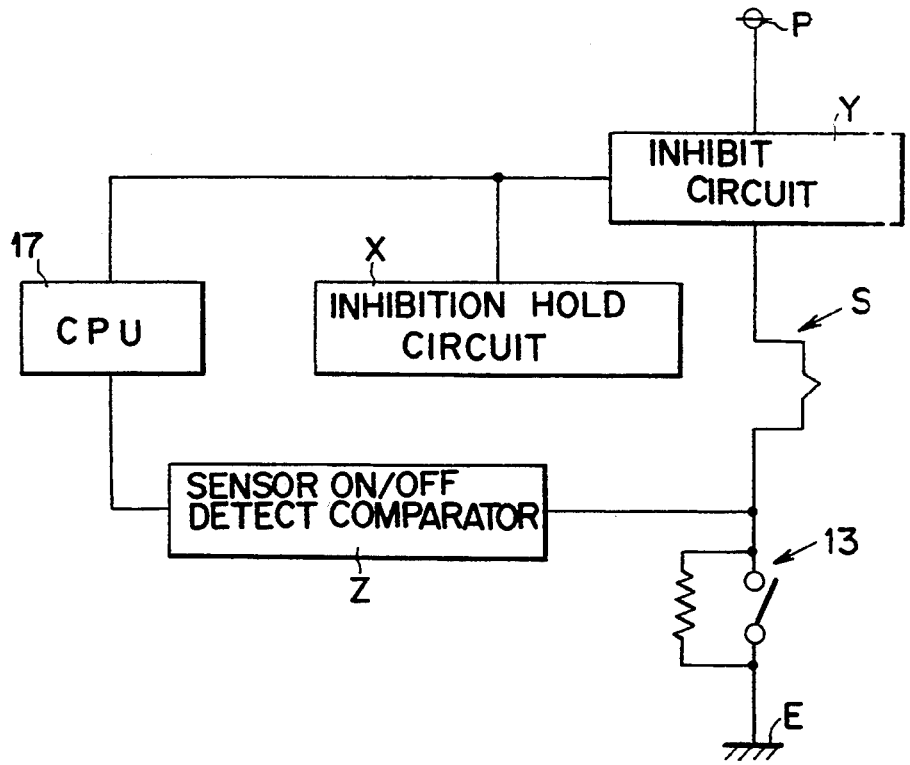
FIGS. 4A to 4D present circuit diagrams showing modifications of the circuit construction shown in FIG. 2, respectively.
Figure 4B:
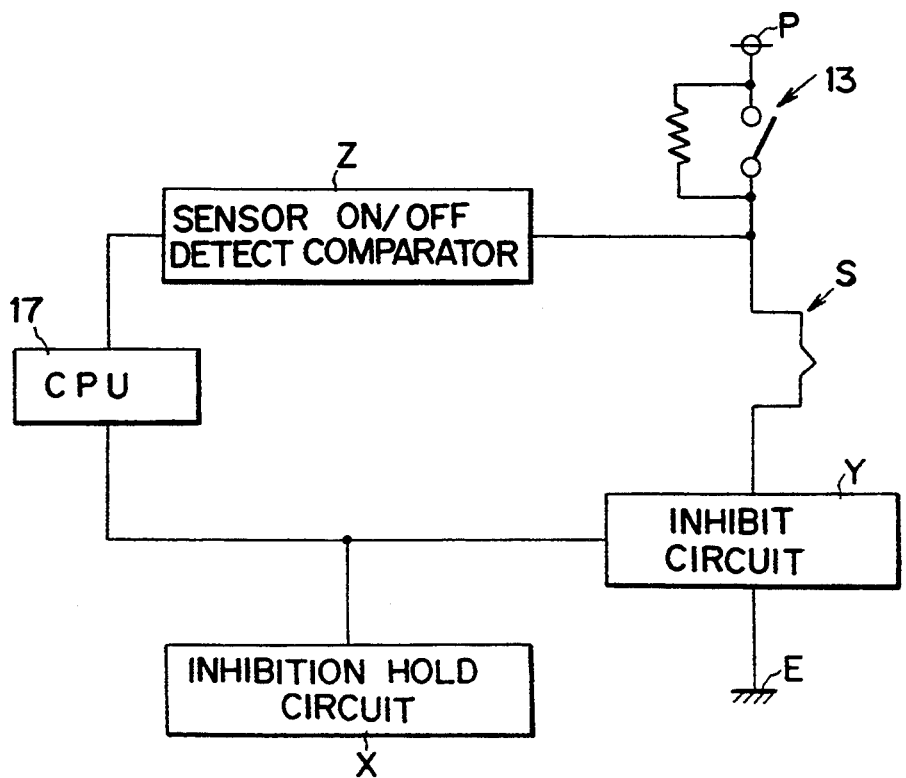
Figure 4C:
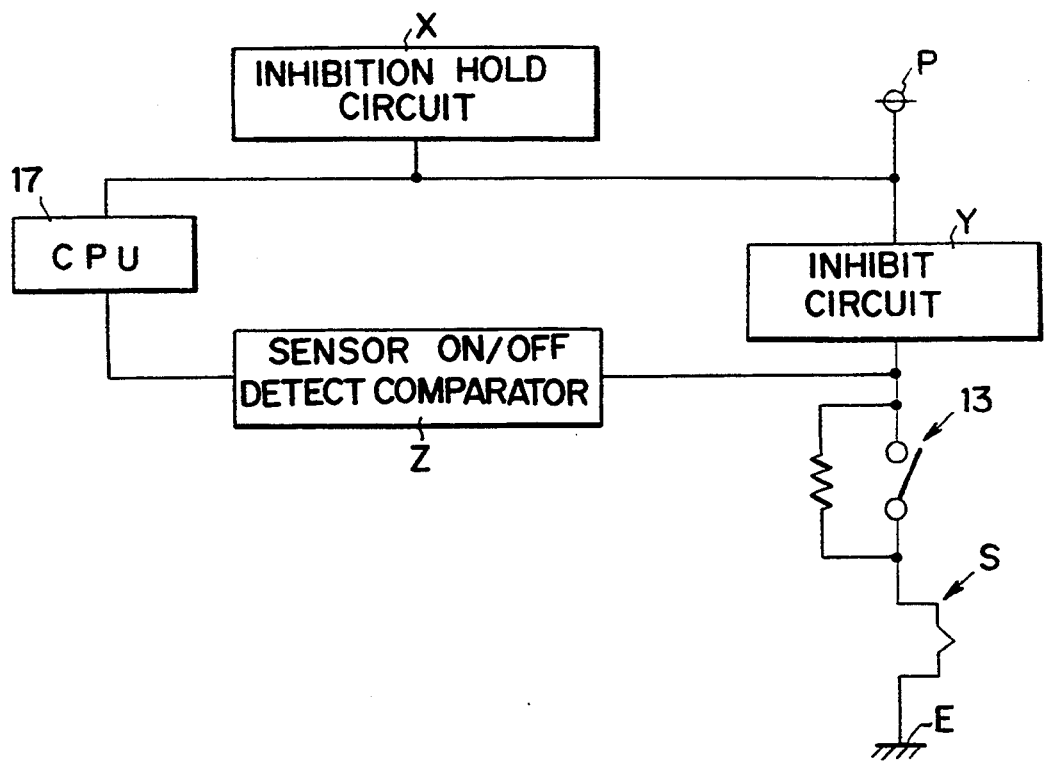
Figure 4D:
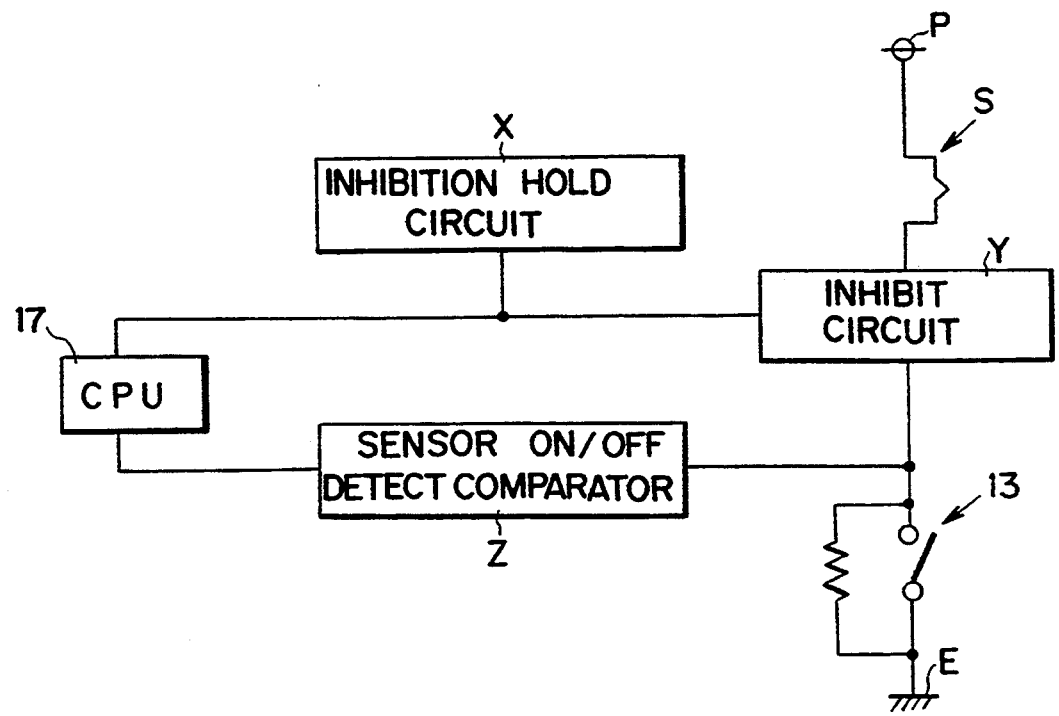

In this embodiment, as having its circuit schematically presented in FIG. 4A, the inhibit circuit Y is interposed between the power source P and the squib S, and the touch sensor 13 is interposed between the squib S and the earth E such that the inhibit circuit Y, the squib S and the touch sensor 13 are connected in series in the recited order. However, the inhibit circuit Y, squib S and touch sensor 13 may be connected by another method, as shown in FIG. 4B. Specifically, the touch sensor 13 is interposed between the power source P and the squib S whereas the inhibit circuit Y is interposed between the squib S and the earth E such that the touch sensor 13, the squib S and the inhibit circuit Y are connected in series in the recited order. As shown in FIG. 4C, moreover, the inhibit circuit Y and the touch sensor 13 are interposed between the power source P and the squib S such that the inhibit circuit Y, the touch sensor 13 and the squib S are connected in series in the recited order. Alternatively, the order of the inhibit circuit Y and the touch sensor 13 may be inverted to connect the touch sensor 13, the inhibit circuit Y and the squib S in series in the recited order. As shown in FIG. 4D, furthermore, the inhibit circuit Y and the touch sensor 13 may be interposed between the squib S and the earth E to connect the squib S, the inhibit circuit Y and the touch sensor 13 in series in the recited order. Alternatively, the positions of the inhibit circuit Y and the touch sensor 13 may be interchanged to connect the squib S, the touch sensor 13 and the inhibit circuit Y in series in the recited order.

Figure 5:
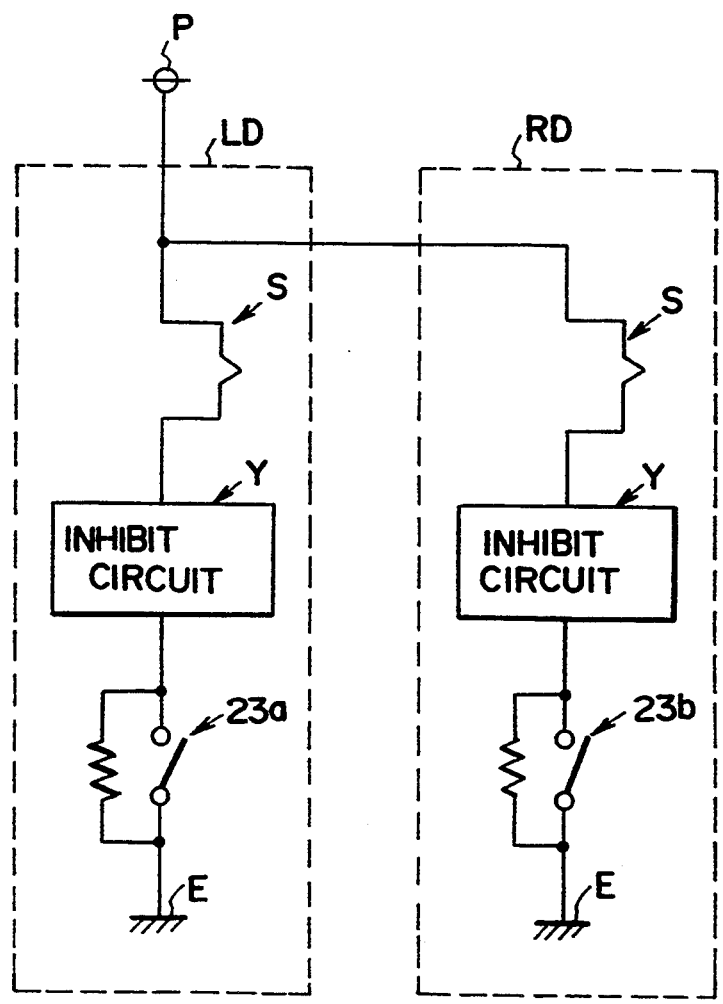
FIG. 5 is an explanatory diagram schematically showing the circuit construction of the air bag operation control system according to a second embodiment of the present invention.
Figure 6:
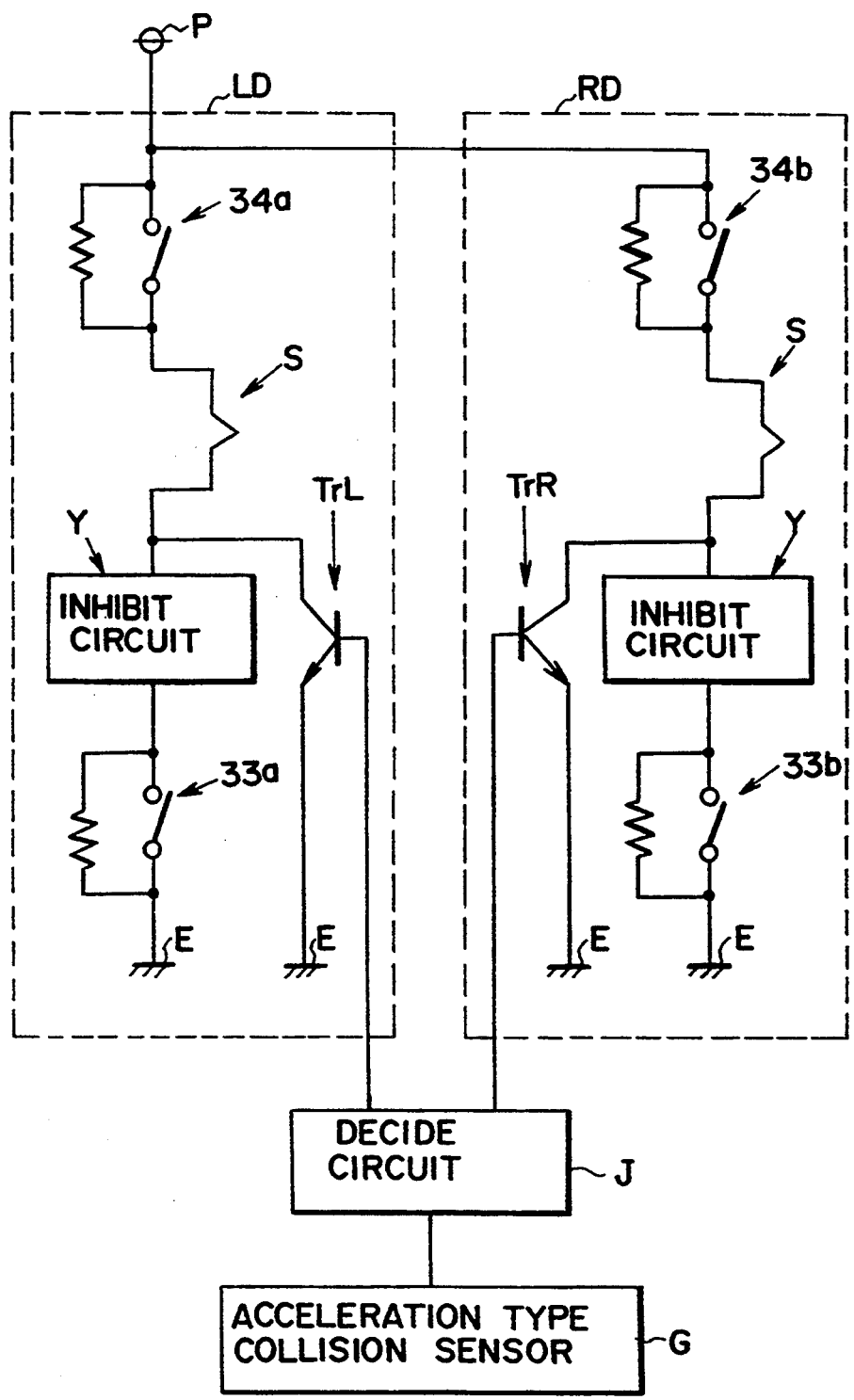
FIG. 6 is an explanatory diagram schematically showing the circuit construction of the air bag operation control system according to a third embodiment of the present invention.

On the other hand, FIG. 5 shows a second embodiment of the operation control system according to the present invention. The squib S for igniting the inflator of the air bag confined in a lefthand door LD and a touch sensor 23a for having its contacts turned ON if compressed by a collision load are connected in series through the inhibit circuit Y and are confined in the lefthand door LD of the vehicle. Moreover, the squib S for igniting the inflator of the air bag confined in a righthand door RD and a touch sensor 23b for having its contacts turned ON if compressed by a collision load are connected in series through the inhibit circuit Y and are confined in the righthand door RD of the vehicle.

Thus, in this embodiment, the touch sensors 23a and 23b of the lefthand and righthand doors LD and RD are individually equipped and connected in series with the inhibit circuits Y. Even if the touch sensor 23a at the lefthand door LD has its contacts closed by an external force applied with the ignition switch being OFF, the air bag confined in the lefthand door exclusively has its operation inhibited by the inhibit circuit Y, while retaining the normal operation of the air bag which is confined in the righthand door RD which has its collision sensor not turned ON. If another vehicle collides against the righthand door RD, the touch sensor 23b confined in the righthand door RD detects the collision and is turned ON. Then, the squib S is electrically energized to ignite the inflator thereby to expand the air bag of the righthand door RD.

Figure 7:
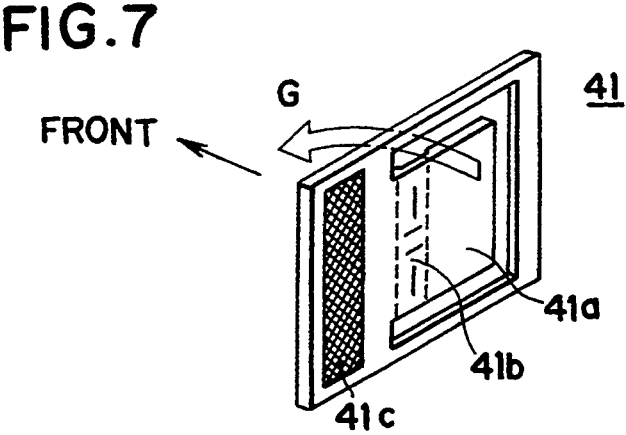
FIG. 7 is a perspective view showing a semiconductor G sensor to be used in the third embodiment.
Figure 8:
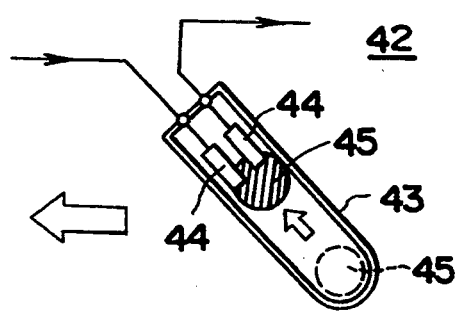
FIG. 8 is a perspective view showing one example of a safing sensor to be used in the third embodiment
Figure 9:
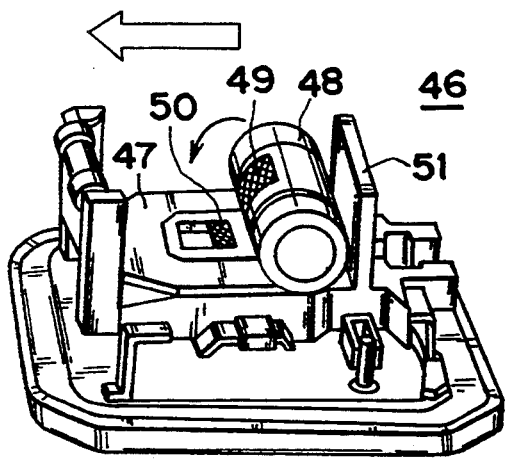
FIG. 9 is a perspective view showing another example of the safing sensor.

On the other hand, FIGS. 6 to 9 show a third embodiment of the operation control system according to the present invention. The lefthand door LD and the righthand door RD of the vehicle are individually equipped with the squibs S for igniting the inflators of the corresponding air bags, and touch sensors 33a and 33b for having their contacts turned ON if compressed by corresponding collision loads. The inflator and the corresponding touch sensor 33a or 33b are connected in series with each other through the inhibit circuit Y. Between the individual squibs S and the power source P, there are interposed safing sensors 34a and 34b which are turned ON if subjected to accelerations exceeding a predetermined level. Each of these safing sensors 34a and 34b acts to prevent the useless expansion of the corresponding air bag at the time of non-collision as in case the touch sensor 33a (or 33b) is turned ON by an external force applied to the outer panel of the corresponding door while the vehicle is being parted, for example. Moreover, the safing sensor 33a or 34b is suitably exemplified by a safing sensor 42 of mercury type, as shown in FIG. 8, or a safing sensor 46 of roller type, as shown in FIG. 9.

The former safing sensor 42 is constructed by confining a predetermined amount of mercury 45 acting as a conductor in a tubular container 43 and by arranging positive and negative electrodes 44 and 44 at a spacing in the upper portion of the container 43. The safing sensor 42 is inclined with respect to the direction (i.e., leftward or rightward of the vehicle body) in which the collision load is applied. Thus, the mercury 45 normally accumulated in the bottom of the container 43 is raised, if subjected to a load exceeding the predetermined level at the time of a side collision, along the inclined inner face to connect the two electrodes 44 and 44. On the other hand, at the time of a non-collision or for a low load, the mercury 45 in the container 43 cannot move to the positions of the electrodes 44. As a result, the safing sensor 42 is not turned ON to leave the squib S unignited even if the corresponding touch sensor 13 is turned ON, to prevent the useless expansion of the air bag.

On the other hand, the latter safing sensor 46 is composed of a roller 48 on which is coiled one end of a plate spring 47, a rotary contact 49 formed on the surface of the roller 48, and a stationary contact 50 projected from an opening which is formed in the uncoiled other end of the plate spring 47. Out of the operation, moreover, the roller 48 is forced to abut against a stopper 51 by a preset load of the plate spring 47 so that the stationary contact 50 and the rotary contact 49 are isolated from each other. If a collision load is applied, the roller 48 turns to move its rotary contact 49 into contact with the stationary contact 50 so that the safing sensor 46 is turned 0N to output an ON signal.

Moreover, a switching circuit by a transistor TrL is connected with the squib S disposed at the lefthand door LD, and a switching circuit by a transistor TrR is connected with the squib S disposed at the righthand door RD. These transistors TrL and TrR are individually connected with a J such as a microcomputer, which in turn is connected with an acceleration type collision sensor G as a second collision sensor. This aceleration type collision sensor G is mounted on a rigid portion such as the frame of the vehicle body so as to detect the magnitude and direction of the acceleration at the time of a side collision of the vehicle. The acceleration thus detected is input to the decide circuit J, in which it is decided what direction the acceleration is inputs in and whether or not the acceleration is higher than a predetermined reference level. Even in case the inflator has its operation inhibited by the inhibit circuit Y, a signal is fed to the transistor TrL of the lefthand door LD of the vehicle body to turn ON the switching circuit of the transistor TrL if it is decided that an acceleration exceeding the reference level is applied to the lefthand door LD. If the safing sensor 34a is ON at this time, the electric current is fed to the squib S to ignite the corresponding inflator.

At a side collision against the righthand door RD, a signal is likewise fed from the decide circuit J to the transistor TrR of the righthand door RD to turn ON the switching circuit of the transistor TrR if it is decided that the acceleration input from the acceleration type collision sensor G to the decide circuit J is higher than the reference level. If the safing sensor 34b is ON at this time, the electric current is fed to the squib S to ignite the corresponding inflator.

Incidentally, the acceleration type collision sensor G described above is exemplified by a semiconductor G sensor 41, as shown in FIG. 7. This G sensor 41 is composed of a cantilever portion 41a made of a metal, a gauge portion 41b formed at the root of the cantilever portion 41a, and an integrated circuit portion 41c for extracting as a signal the resistance change which is caused by the deformation of the gauge portion 41b when the cantilever portion 41a is swung by its leading end acting as a weight. The semiconductor G sensor 41 can be used as a front collision sensor, if it is attached such that the cantilever portion 41a can swing longitudinally of the vehicle body, and is given a positive value forward of the vehicle and a negative value backward of the vehicle. On the other hand, the G sensor 41 can be used as a side collision sensor, if it is attached such that the cantilever portion 41a can swing transversely of the vehicle body, and is given a positive value rightward of the vehicle body running forward and a negative value leftward of the vehicle body.

Thus, according to the operation control system of this embodiment, at the time of a side collision, the igniting current is fed directly, i.e., not through the inhibit circuit Y or the like from acceleration type collision sensor 41 to the squib S of the inflator in the corresponding lefthand or righthand door LD or RD. As a result, the collision is detected by the collision sensor 41 to operate the air bag system so that the air bag can be expanded to protect the occupant from a secondary collision, even if the collision detected signal from the touch sensor 33a or 33b of the corresponding door LD or RD is caused to feed no igniting current to the squib by the action of the inhibit circuit Y or the like.

In this embodiment, moreover, the inhibit circuit Y is attached as in the foregoing first embodiment to each of the touch sensors 33a and 33b of the lefthand and righthand doors LD and RD. As a result, the inhibit circuit Y acts only upon the touch sensor 33a (or 33b) which has its contacts already closed when the ignition switch is turned ON, for example, to inhibit the operation of the corresponding air bag so that the useless expansion of the air bag can be prevented while retaining the normal operation of the other trouble-free touch sensor.

Figure 10:
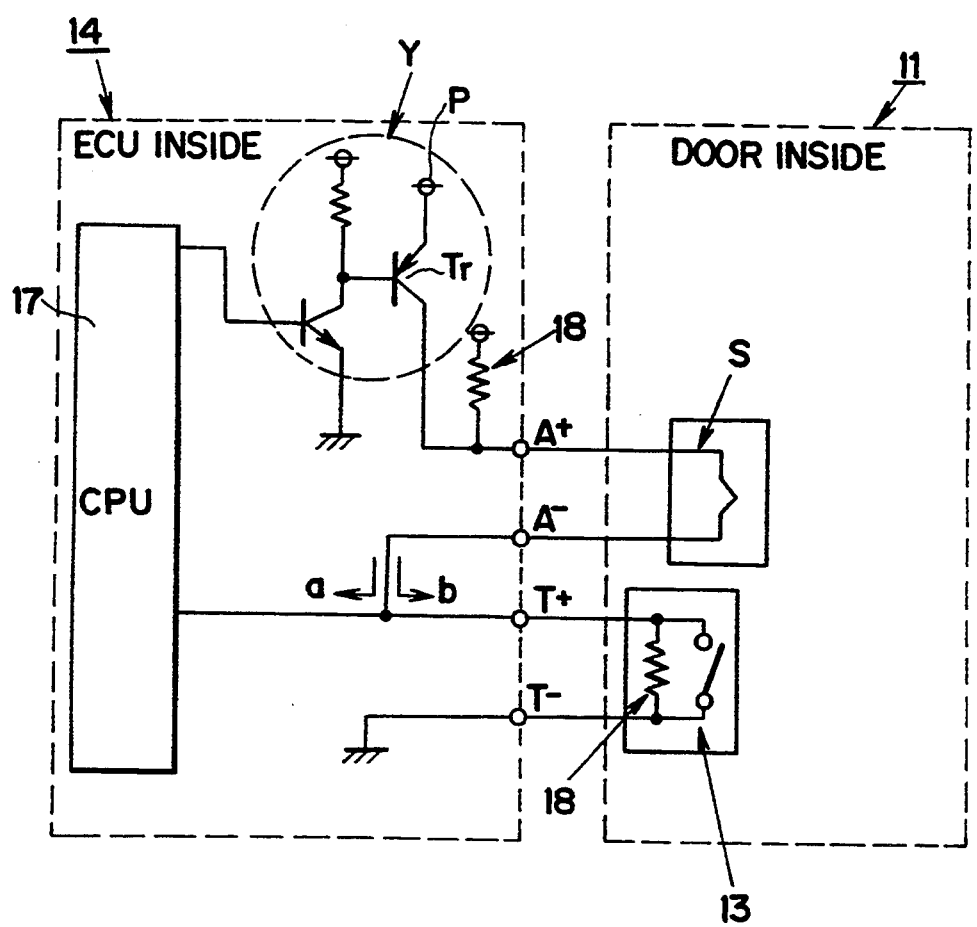
FIG. 10 is a circuit diagram showing the construction of an air bag operation control system according to a fourth embodiment of the present invention.
Figure 11:
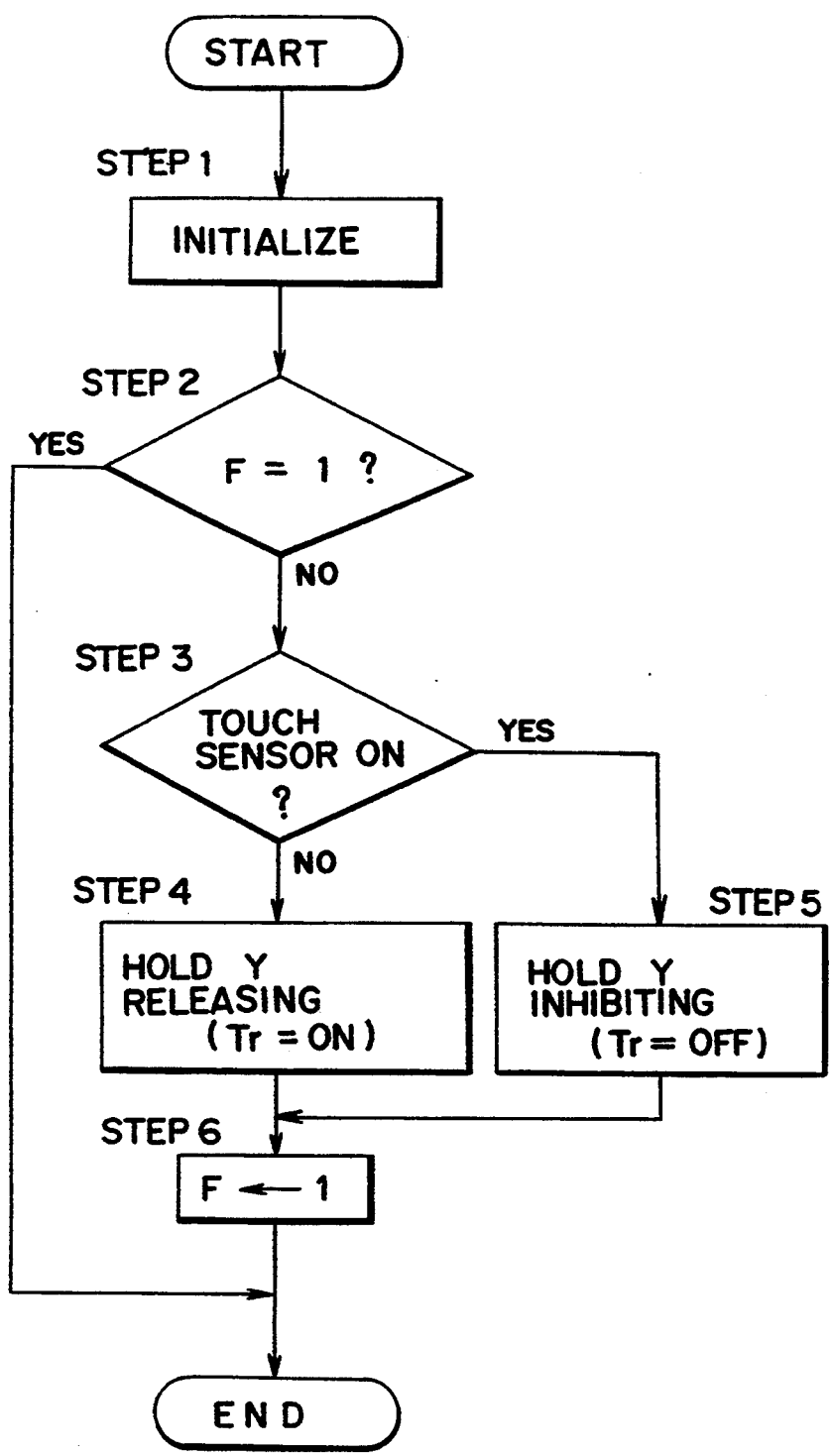
FIG. 11 is a flow chart showing one example of a control routine in the air bag operation control system of the fourth embodiment of the present invention.

On the other hand, FIGS. 10 and 11 show a fourth embodiment of the present invention, in which the action of the comparator Z of the air bag operation control unit 14 in the foregoing first embodiment is additionally carried out by the microcomputer 17. On the inner side of the side door 11 of the vehicle, there is mounted the air bag module which confines the air bag and the inflator. This inflator is connected with the air bag operation control unit (ECU) 14. Incidentally, this fourth embodiment is equipped like the first embodiment with the inhibition hold circuit X in the air bag operation control unit 14, although not shown in FIG. 10.

Moreover, the air bag operation control unit 14 has its microcomputer 17 given a function to detect whether or not the ON signal of the touch sensor 13 is output when the main switch is turned ON from OFF. Between the microcomputer 17 and the squib S, moreover, there is interposed the inhibit circuit Y for inhibiting the air bag operation to block the electric current to the squib S thereby to inhibit the ignition of the inflator, if the ON signal of the touch sensor 13 is output when the ignition switch (or the main switch) is switched from OFF to ON. On the other hand, the inhibit circuit Y permits the normal operation of the side air bag system, if the ON signal output of the touch sensor 13 is not detected when the ignition switch is turned ON. In other words, the current is fed to the squib S of the inflator of the air bag module to expand the air bag, if a side collision is detected after the ignition switch is turned ON.

Here will be described the operations of this embodiment thus constructed, with reference to the flow chart of FIG. 11.

When a driver switches the main switch or ignition switch from OFF to ON to start the vehicle, the control routine of the air bag operation control unit 14 starts simultaneously with the power ON.

At first, the control routine is initialized at Step 1. In this initialization, a later-described flag F is reset. At Step 2, it is then checked whether the flag F is set.

Next, the routine advances to Step 3, at which it is detected whether the ON signal from the touch sensor 13 is detected. If the answer is NO, the routine advances to Step 4, at which the signal for turning ON the transistor Tr of the inhibit circuit Y is output to release the inhibited state.

From now on, the air bag system operates in its normal mode. If the vehicle has its side hit by another vehicle with the main or ignition switch being ON as in the run of the vehicle, the touch sensor 13 arranged in the side door 11 is pressed to have its contacts connected so that the current flows to ignite the squib S of the inflator through the transistor Tr of the inhibit circuit Y. As a result, the air bag confined in the inner side of the side door 11 is expanded by the nitrogen gas produced by the inflator, to protect the occupant against a secondary collision.

On the other hand, if the side door 11 is kicked by a relatively high force while the ignition (or main) switch is OFF such as when parked, the side door 11 may have its outer panel 11a deformed to close the contacts of the touch sensor 13 arranged therein. At this time, however, the ignition switch is OFF so that the air bag is not expanded.

When the driver switches the ignition switch from OFF to ON to start the vehicle, the control routine described above advances through Steps 1 and 2 to Step 3, at which the ON state of the touch sensor is detected, and further to Step 5. At Step 5, the signal for turning OFF the transistor Tr is output to hold the inhibit circuit Y in the inhibiting state. If this state of inhibiting the air bag operation is held, the driver is informed of the occurrence of a malfunction by lighting the warning lamp on the instrumental panel or by the sound of the buzzer or the spoken notice.

In case, moreover, the malfunction of the air bag system is noticed by the warning lamp or the buzzer, the outer panel has to be repaired in the service shop before the vehicle is reused. At this time, the repair does not require the replacement of the air bag module because the air bag has not been expanded. When the operations of Steps 4 and 5 are ended, as described above, the flag F for storing that the ON state of the touch sensor when the ignition switch is switched from OFF has been checked is set at Step 6.

In the foregoing first to fourth embodiments, moreover, the release of the inhibit circuit Y for inhibiting the operation of the air bag system is carried out in the following manner by providing the inhibition hold circuit X. Specifically, the inhibited state is held by the capacitance type power-on timer of the inhibition hold circuit X for the predetermined time period in which the operation becomes unstable such as at the start of the computer immediately after the ignition switch IG is turned ON. When the capacitor is charged up to a predetermined extent after a lapse of the predetermined time period, the aforementioned inhibited state is released if the contacts of the touch sensor 13 are not closed at that instant. Alternatively, a program counter as the power-on timer for starting when the ignition switch IG is turned ON is packaged in the microcomputer 17 of the air bag operation control unit 14, so that the inhibited state may be held for the predetermined time period by the program counter in the microcomputer 17 even after the hold time period by the inhibition hold circuit X elapses.

This program counter starts its counting operation in response to the ON of the ignition switch IG and releases the inhibited state when the counted number reaches a predetermined value, that is, when the predetermined time period elapses, if the touch sensor 13 is not ON. However, the time period of the power-on timer by the program counter has a difficulty in its proper setting. If tile predetermined time period is excessively long, the inhibited state is so prolonged that the operation of the air bag system is still inhibited when necessary, e.g., after the vehicle has already started running. If the time period is excessively short, it is impossible to detect the ON/OFF state of the touch sensor reliably, for example.

Therefore, the time period is so determined that the inhibited state may be held for a constant time period by the power-on timer. At the same time, there is provided inhibition release signal output means for outputting an inhibition release signal to release the inhibited state of the inflator operation if a predetermined vehicular state is detected, such as the state in which the air bag has to be operable as the vehicle is running at a predetermined speed or more, or the state in which the engine is rotating at a predetermined r.p.m. or more. Moreover, if the inhibition release signal is output, the inhibited state is released to render the air bag operable even in the course of the predetermined time period of the power-on timer.

Figure 12:
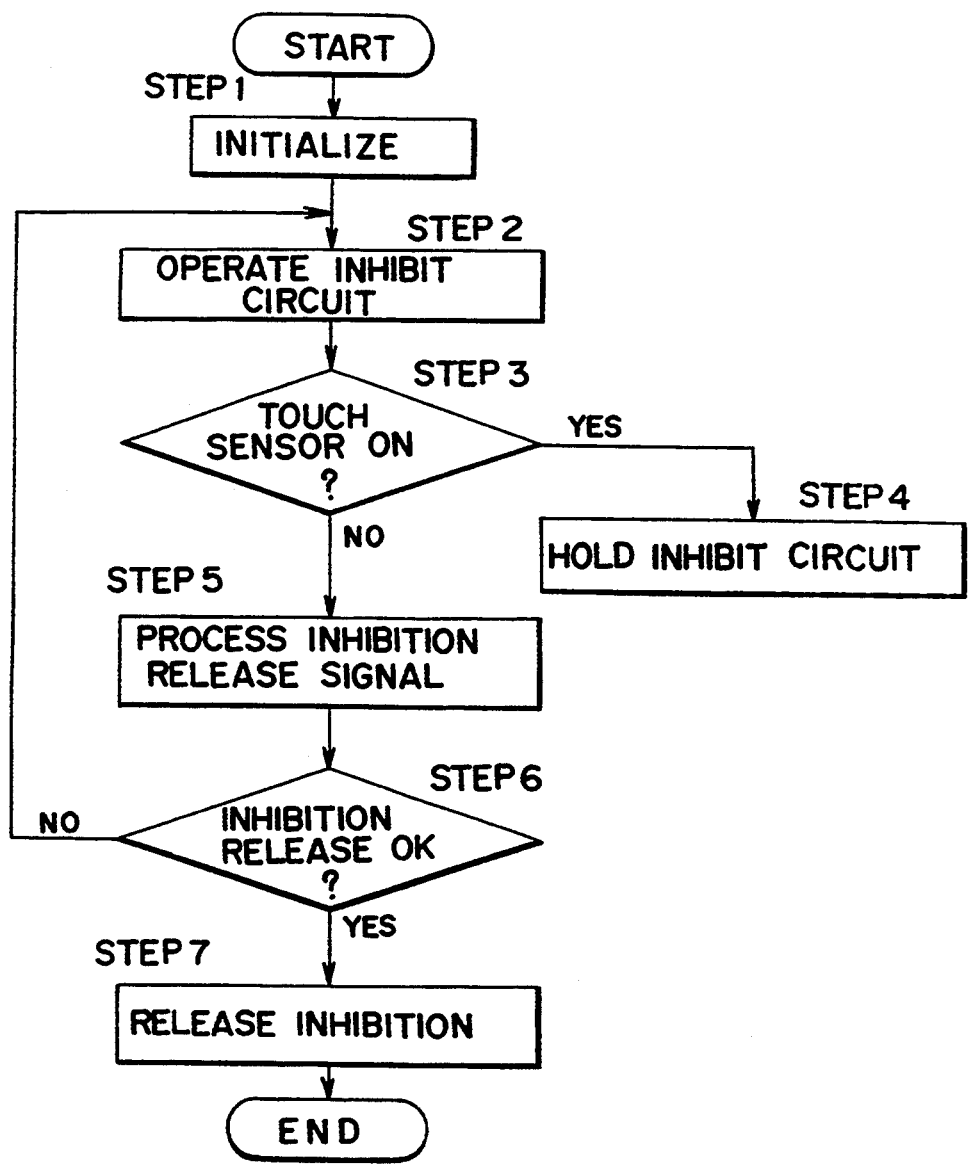
FIG. 12 is a flow chart showing one example of a control routine in an air bag operation control system in case an inhibition hold circuit is provided.

FIG. 12 is a flow chart showing one example of the control routine of the control system in case the inhibition release signal output means is provided. With reference to this flow chart, the control of the inhibition release of this case will be described in the following.

When the driver switches the ignition switch from OFF to ON, the control routine of the air bag operation control unit 14 is started simultaneously with the power ON.

First of all, the routine is initialized at Step 1 and advances to Step 2, at which the inhibit circuit is operated to inhibit the operation of the air bag.

Next, the routine advances to Step 3, at which the ON signal of the touch sensor is detected. If the ON state of the touch sensor is then detected, the routine advances to Step 4, at which the inhibit circuit is held to inform the malfunction of the touch sensor, if necessary, to the driver by lighting the warning lamp or the like.

On the other hand, if the ON signal of the touch sensor is not detected at Step 3, the routine advances to Step 5. The inhibition release signal from the inhibition release signal output means is input, it is processed at Step 5, and the routine advances to Step 6. If the result of signal processing permits the inhibition release, the routine further advances to Step 7, at which the inhibited state is released to retain the normal air bag operation. If the signal processing result does not allow the inhibition release, the routine returns to Step 2, at which the inhibited state is continued.

By thus releasing the inhibited state in response to the signal from the inhibition release signal output means, the inhibition is released, if the air bag operation is required, even in the course of the predetermined time period of the power-on timer so that the normal air bag operation is retained.

Figure 13:
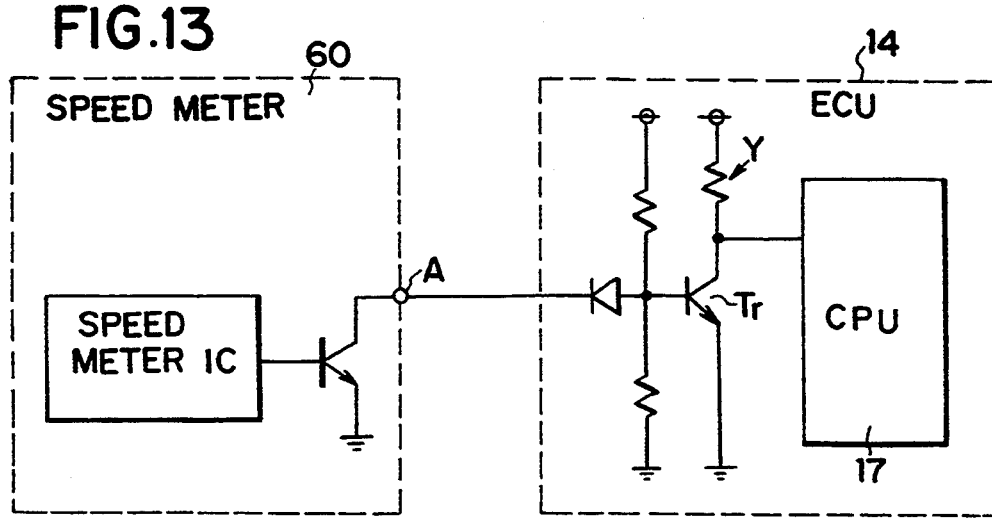
FIG. 13 is a circuit diagram showing the construction of an essential portion of an air bag operation control system according to a fifth embodiment of the present invention.
Figure 14:
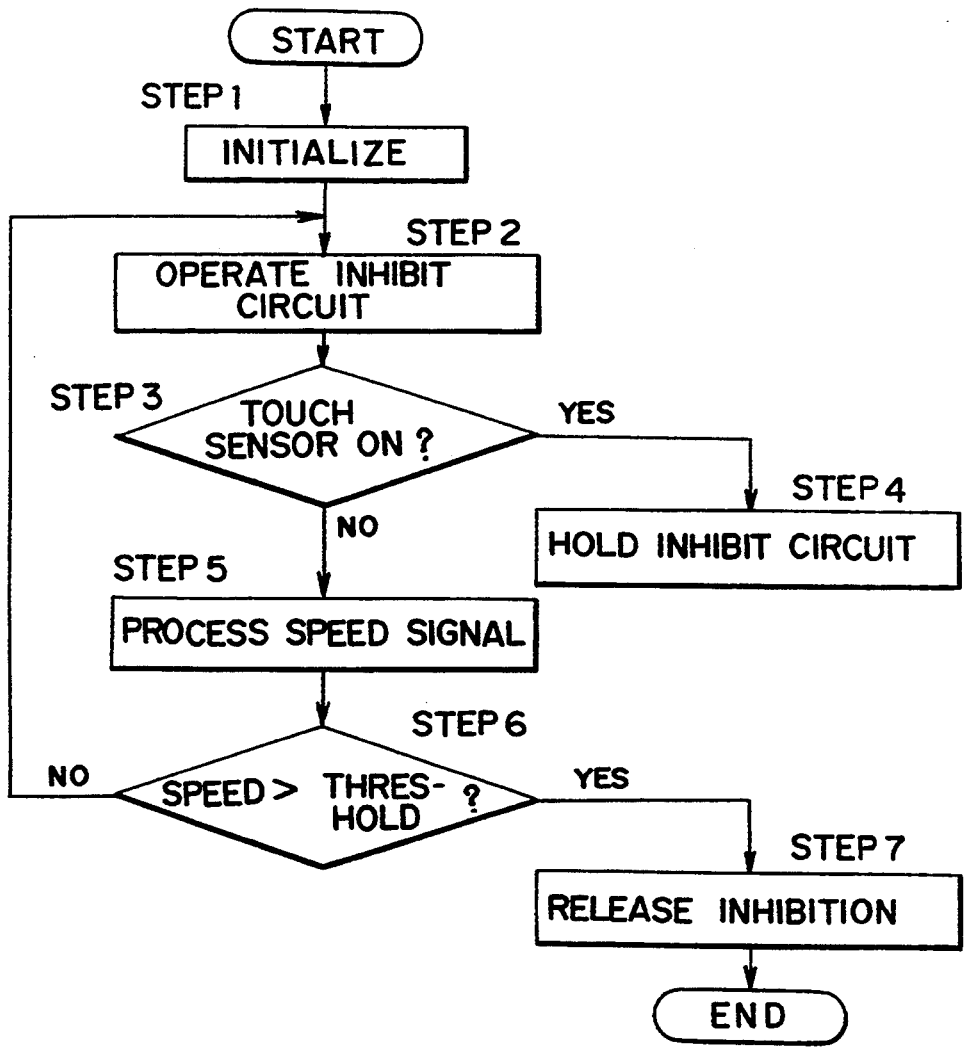
FIG. 14 is a flow chart showing one example of a control routine in the air bag operation control system of the fifth embodiment of the present invention.
Figure 15:
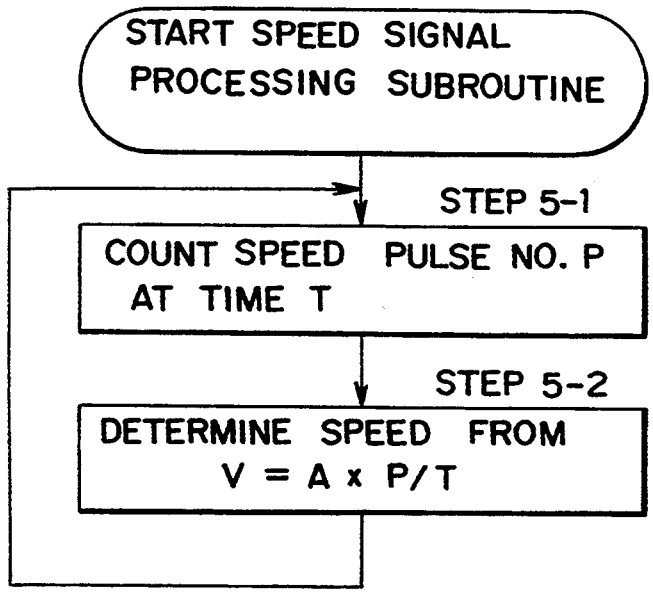
FIG. 15 is a flow chart showing a subroutine for processing a vehicle speed signal.

Here will be described the present invention in connection with specific examples of the parameters when the inhibition release signal is output. FIGS. 13 to 15 show a fifth embodiment of the present invention, in which a vehicle speed indicating the running state of the vehicle is adopted as the parameter when the inhibition release signal is output, as will be described in the following with reference to the drawings.

The air bag operation control unit (ECU) 14 is composed of the inhibit circuit Y and the microcomputer 17 for holding the inhibited state and acting as the power-on timer. A speed meter 60 acting as the inhibition release signal output means is connected with a terminal A, from which can be extracted the vehicle speed signal produced by the speed sensor in the meter. Thus, the vehicle speed signal extracted is processed to determine the vehicle speed, and this vehicle speed is then compared with a predetermined threshold value so that the inhibited state is released only if the vehicle speed exceeds the threshold value.

Here will be described the operations of this embodiment with reference to the flow chart of FIGS. 14 and 15.

When the driver switches the ignition switch from OFF to ON, the control routine of the air bag operation control unit 14 is started simultaneously with the power ON.

First of all, the routine is initialized at Step 1 and then advances to Step 2, at which the inhibit circuit is operated to inhibit the operation of the air bag.

Next, the routine advances to Step 3, at which the ON signal of the touch sensor is detected. If the ON state of the touch sensor is detected at this time, the routine advances to Step 4, at which the inhibit circuit is held, and the driver is informed of the malfunction of the touch sensor, if necessary, by lighting the warning lamp or the like.

If the ON signal of the touch sensor is not detected at Step 3, the routine advances to Step 5. If the vehicle speed signal is input from the speed meter 60, the input signal is processed at Step 5.

In this signal processing, as illustrated in the subroutine of FIG. 15, the vehicle speed pulse number P is firstly counted at Step 5-1 for a constant time period T, and the vehicle speed is then determined at Step 5-2 by the following formula of Vehicle Speed $v = A \times P/T$ (A: Constant).

Then, the determined vehicle speed v is compared at Step 6 with the predetermined threshold value. If the vehicle speed v is higher than the threshold value, the routine advances to Step 7, at which the signal for turning ON the transistor Tr of the inhibit circuit Y is output to release the inhibited state. On the other hand, if the comparison of Step 6 reveals that the vehicle speed v is lower than the threshold value, the routine is returned to Step 2, at which the inhibited state is continued.

Figure 16:
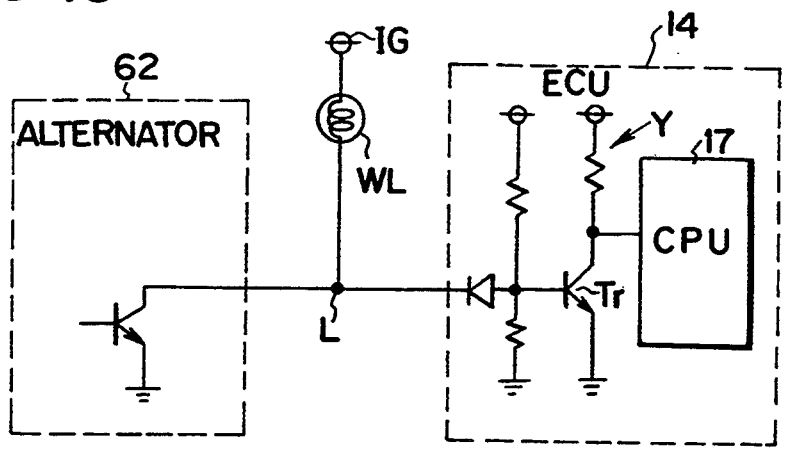
FIG. 16 is a circuit diagram showing the construction of an essential portion of an air bag operation control system according to a sixth embodiment of the present invention.
Figure 17:
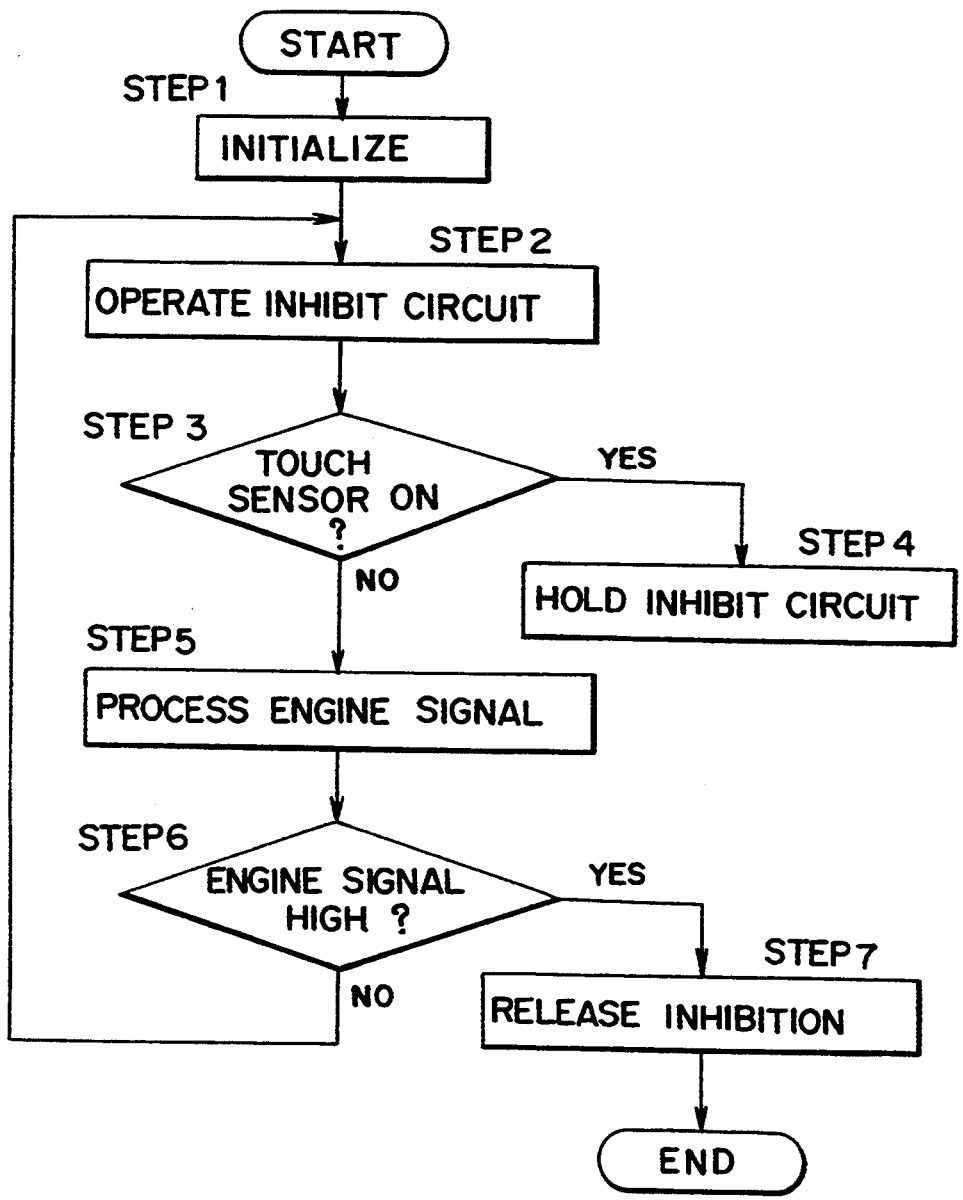
FIG. 17 is a flow chart showing one example of a control routine in the air bag operation control system of the sixth embodiment of the present invention.

On the other hand, FIGS. 16 and 17 show a sixth embodiment of the present invention, in which the signal of an alternator indicating the driving state of the engine indirectly is adopted as the parameter for outputting the inhibition release signal, as will be described in the following with reference to the drawing.

The air bag operation control unit (ECU) 14 is composed of the inhibit circuit Y and the microcomputer 17 for holding the inhibited state and acting as the power-on timer. With this air bag operation control unit 14, there is connected the terminal L of a warning lamp WL for indicating the engine stop or the malfunction of the charge system of an alternator 62 acting as the inhibition release signal output means. Moreover, the engine signal thus extracted is processed, and the inhibited state is released only if the engine signal is at the high level.

Here will be described the operations of this embodiment with reference to the flow chart of FIG. 17.

When the driver switches the ignition switch IG from OFF to ON, the control routine of the air bag operation control unit 14 is started simultaneously with the power ON.

First of all, the routine is initialized at Step 1 and then advances to Step 2, at which the inhibit circuit is operated to inhibit the operation of the air bag.

Next, the routine advances to Step 3, at which the ON signal of the touch sensor is detected. If the ON state of the touch sensor is detected at this time, the routine advances to Step 4, at which the inhibit circuit is held to inform the driver of the malfunction of the touch sensor, if necessary, by lighting the warning lamp or the like.

On the other hand, if the ON signal of the touch sensor is not detected at Step 3, the routine advances to Step 5. If the engine signal is then input from the alternator 62, it is processed at Step 5. And, the processed engine signal is checked. If this signal is at the high level, the routine advances to Step 7, at which the signal for turning ON the transistor Tr of the inhibit circuit Y is output to release the inhibited state. If the engine signal is at the low level at Step 6, the routine returns to Step 2, at which the inhibited state is continued.

Incidentally, in this embodiment, the drive state of the engine is monitored by using as the signal the electric current at the terminal L of the warning lamp WL of the alternator 62. However, the current at the terminal of the tachometer can be extracted and used as the signal.

Figure 18:
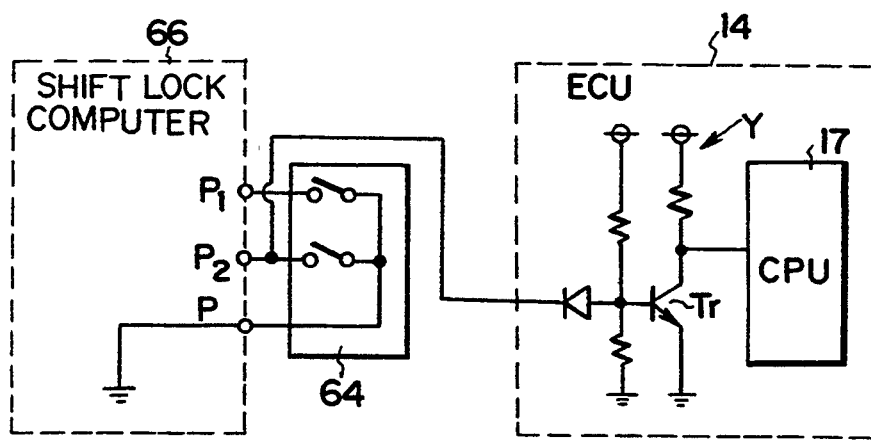
FIG. 18 is a circuit diagram showing the construction of an essential portion of an air bag operation control system according to a seventh embodiment of the present invention.
Figure 19:
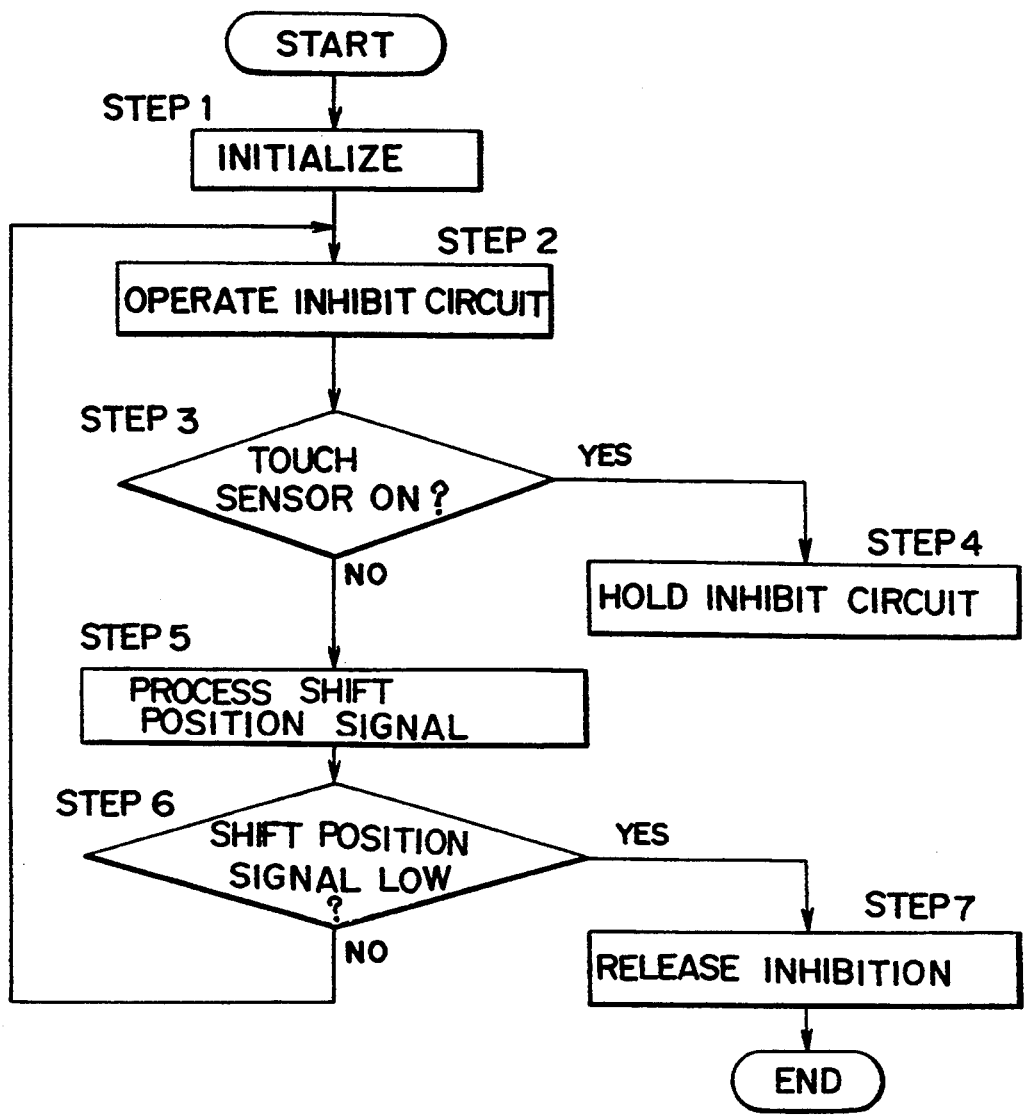
FIG. 19 is a flow chart showing one example of a control routine in the air bag operation control system of the seventh embodiment of the present invention.

Moreover, FIGS. 18 and 19 illustrate an eighth embodiment of the present invention, in which the parameter for outputting the inhibition release signal is exemplified by the electric current to flow through the shift lock control switch for indicating that the shift lever of an automatic vehicle is disposed in a position other than the P range, as will be described in the following with reference to the drawing.

The air bag operation control unit (ECU) 14 is composed of the inhibit circuit Y and the microcomputer 17 for holding the inhibited state and acting as the power-on timer. With the air bag operation control unit 14, there is connected a shift lock control switch 64 acting as the inhibition release signal out put means. Moreover, this shift lock control switch 64 is equipped with three terminals P, P$_1$ and P$_2$ (as shown in FIG. 18), of which the terminal P is earthed in a shift lock computer 66 whereas the terminal P$_2$ is connected with the terminal P when the shift lever is in a position other than the P range. In other words, the terminal P$_2$ produces a signal at the low level when in a position other than the P range. Moreover, the shift lock control switch 64 is connected with the shift lock computer 66 and processes the shift position signal which is detected if the shift lever knob button is depressed (as is expressed by the will of the driver to change the shift) when the shift lever is positioned in a range other than the P range, such as the low (L) range, the second (2nd) range, the drive (D) range, the neutral (N) range, the reverse (R) range or the parking range. As the signal processing result, the inhibited state is released only if the shift position signal is at the low level.

Here will be described the operations of this embodiment with reference to the flow chart of FIG. 19.

When the driver switches the ignition switch IG from OFF to ON, the control routine of the air bag operation control unit 14 is started simultaneously with the power ON.

First of all, the routine is initialized at Step 1 and then advances to Step 2, at which the inhibit circuit is operated to inhibit the operation of the air bag.

Next, the routine advances to Step 3, at which the ON signal of the touch sensor is detected. If the ON state of the touch sensor is detected at this time, the routine advances to Step 4, at which the inhibit circuit is held to inform the driver of the malfunction of the touch sensor, if necessary, by lighting the warning lamp or the like.

On the other hand, if the ON signal of the touch sensor is not detected at Step 3, the routine advances to Step 5. If the shift position signal is then input from the shift control switch 64, it is processed at Step 5. And, if the processed shift position signal is at the low level, the routine advances to Step 7, at which the signal for turning ON the transistor Tr of the inhibit circuit Y is output to release the inhibited state. If the shift position signal is at the high level at Step 6, the routine returns to Step 2, at which the inhibited state is continued.

Incidentally, in this embodiment, the shift position signal is extracted from the shift lock control switch 64 but may be extracted from the shift position indicator.

Figure 20:
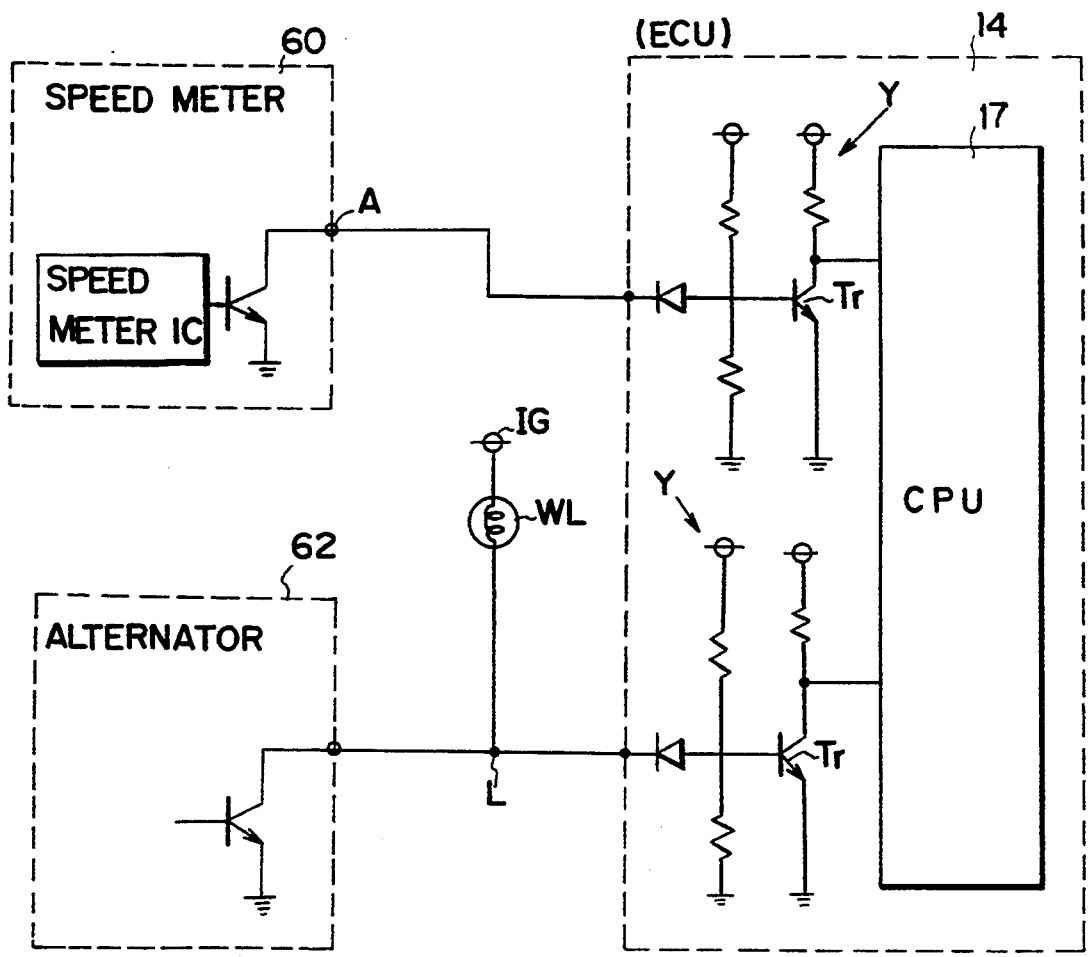
FIG. 20 is a circuit diagram showing the construction of an essential portion of an air bag operation control system according to a eighth embodiment of the present invention.
Figure 21:
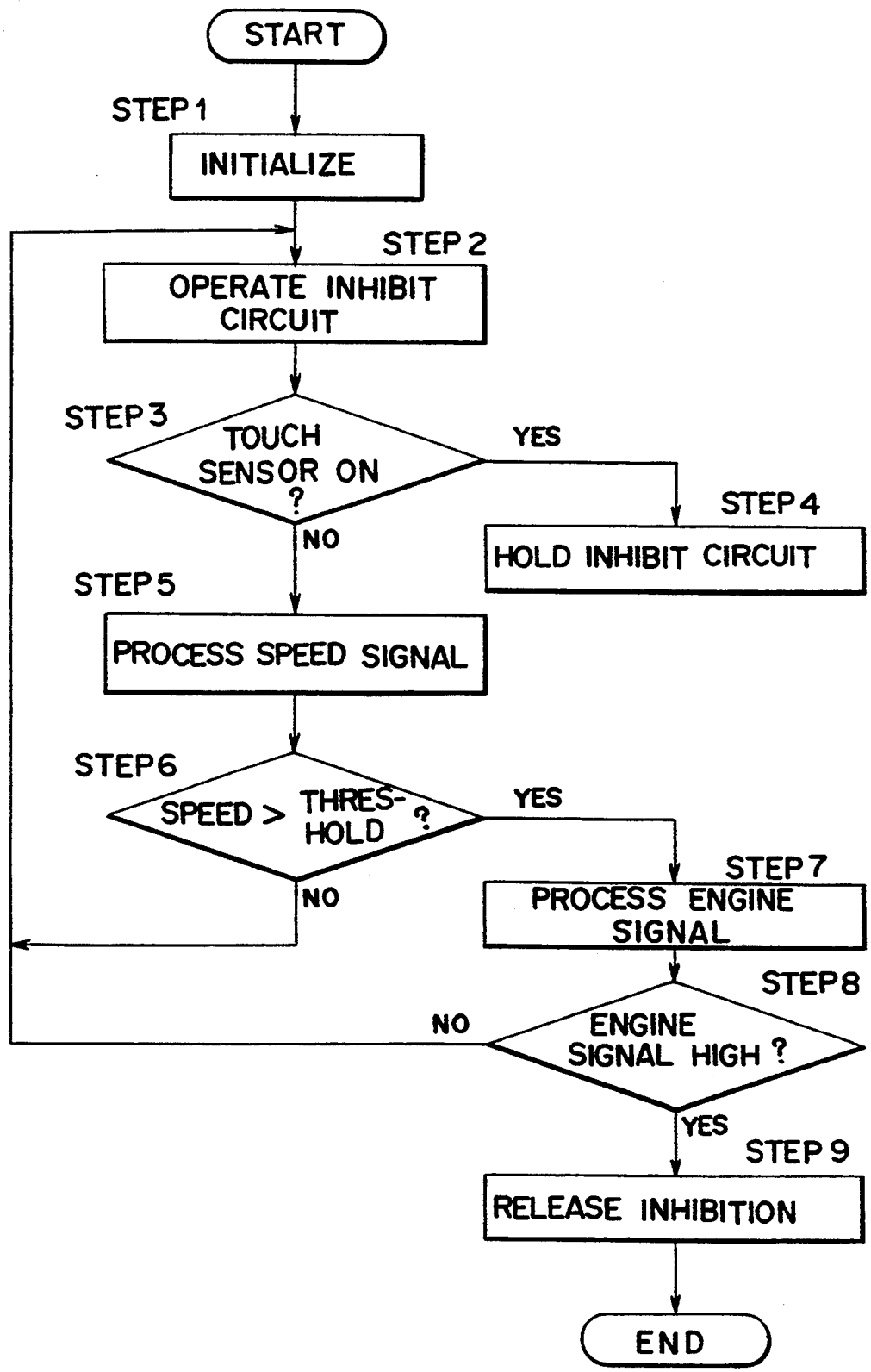
FIG. 21 is a flow chart showing one example of a control routine in the air bag operation control system of the eighth embodiment of the present invention.
Figure 22:
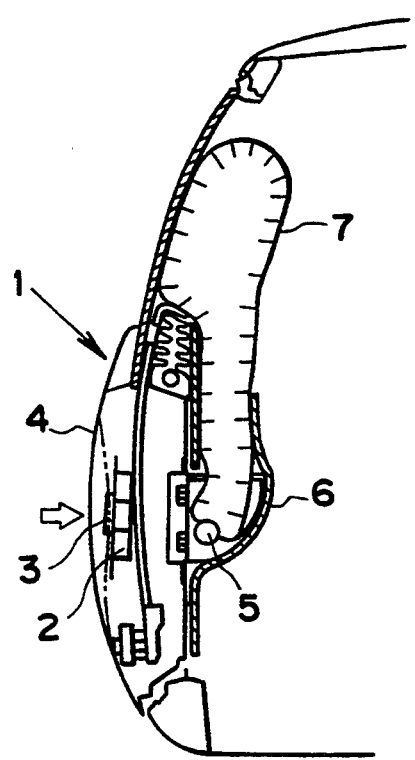
FIG. 22 is a section of a vehicle body and shows one example of the side collision air bag system of the prior art.

Moreover, FIGS. 20 and 21 show an eighth embodiment of the present invention, in which both the vehicle speed signal adopted in the foregoing fifth embodiment and the engine signal adopted in the sixth embodiment are used as the parameters for outputting the inhibition release signal, thereby to control the inhibition release more reliably. As shown in FIG. 20, the air bag operation control unit (ECU) 14 is composed of the inhibit circuit Y and the microcomputer 17 for holding the inhibited state. In this microcomputer 17, there is packaged a power-on timer using the program counter. With this microcomputer 17, there are connected: through the inhibit circuit Y the terminal A, from which the speed meter 60 acting as the inhibition release signal output means can extract the vehicle speed signal produced by the speed sensor in the meter; and through the inhibit circuit Y the terminal L of the warning lamp WL indicating the engine stop of the alternator 62 acting as another inhibition release signal output means or the malfunction of the charging system.

Thus, the inhibited state is released if there are satisfied the two conditions that the vehicle speed determined by processing the vehicle speed signal extracted from the aforementioned speed meter 60 is higher than the threshold value, and that the engine signal extracted from the terminal L of the warning lamp WL indicating the engine stop of the alternator 62 or the malfunction of the charging system is at the high level.

Here will be described the operations of this embodiment with reference to the flow chart of FIG. 21.

When the driver switches the ignition switch IG from OFF to ON, the control routine of the air bag operation control unit 14 is started simultaneously with the power ON.

First of all, the routine is initialized at Step 1 and then advances to Step 2, at which the inhibit circuit is operated to inhibit the operation of the air bag.

Next, the routine advances to Step 3, at which the ON signal of the touch sensor is detected. If the ON state of the touch sensor is detected at this time, the routine advances to Step 4, at which the inhibit circuit is held to inform the driver of the malfunction of the touch sensor, if necessary, by lighting the warning lamp or the like.

On the other hand, if the ON signal of the touch sensor is not detected at Step 3, the routine advances to Step 5. If the vehicle speed signal is then input from the speed meter 60, it is processed at Step 5 to determine the vehicle speed v.

Then, the determined vehicle speed is compared at Step 6 with the predetermined threshold value. If the vehicle speed v is higher than the threshold value, the routine advances to Step 7. On the other hand, if the comparison result of Step 6 reveals that the vehicle speed v is lower than the threshold value, the routine returns to Step 2, at which the inhibited state is continued.

At Step 7, moreover, the engine signal input from the alternator is processed. Then, the routine advances to Step 8, at which it is checked whether the processed engine signal is at the high level. If the answer of this check is YES, the routine advances to Step 9, at which the signal for turning ON the transistor Tr of the inhibit circuit Y is output to release the inhibited state. On the other hand, if it is decided at Step 8 that the engine signal is at the low level, the routine returns to Step 2, at which the inhibited state is continued.

By thus using both the engine signal and the vehicle speed signal, the inhibition release can be controlled more reliably.

Incidentally, in the individual embodiments described above, the present invention has been described in case it is applied to the operation control system for the side air bag system but can also be applied to an operation control system for a front collision air bag system.

What is claimed is:

1. An operation control system to be used with a vehicular air bag system for protecting an occupant of a vehicle against an impact of a vehicular collision by expanding a first air bag, comprising:
    a first collision sensor for detecting a deformation of a body of said vehicle during said vehicular collision;
    a first inflator for producing and feeding a gas to said first air bag, when said first inflator is electrically energized and ignited;
    a main switch of said vehicle for feeding an electric current to electrically energize said first inflator in a closed position of said main switch;
    first inhibit means for inhibiting said electrical energization of said first inflator when said first collision sensor detects said deformation of said body of said vehicle while said main switch is in an open position; and
    an acceleration sensor for detecting an acceleration in said body of said vehicle due to said vehicular collision;
    wherein said first inflator is electrically energized irrespective of said inhibition by said first inhibit means when said acceleration sensor detects said acceleration due to said vehicular collision.

2. An operation control system to be used with a vehicular air bag system for protecting an occupant of a vehicle against an impact of a vehicular collision by expanding an air bag, comprising:
    a collision sensor for detecting a deformation of a body of said vehicle during said vehicular collision;
    an inflator for producing and feeding a gas to said air bag, when said inflator is electrically energized and ignited;
    a main switch of said vehicle for feeding an electric current to electrically energize said inflator in a closed position of said main switch;
    inhibit means for inhibiting said electrical energization of said inflator when said collision sensor detects said deformation of said body of said vehicle while said main switch is in an open position;
    a timer for releasing said inhibition of said electrical energization of said inflator after said electrical energization of said inflator has been inhibited for a predetermined time period after said main switch is placed in said closed position; and
    inhibition release signal output means for outputting an inhibition release signal to release said inhibition of said electrical energization of said inflator by said inhibit means when a predetermined state of said vehicle is detected.

3. An operation control system according to claim 2, wherein said inhibition release signal output means includes means for outputting said inhibition release signal when a running state of said vehicle is detected in a predetermined state.

4. An operation control system according to claim 2, wherein said inhibition release signal output means includes means for outputting said inhibition release signal when a driving state of said engine of said vehicle is detected in a predetermined state.

5. An operation control system according to claim 2, further comprising:
    an automatic transmission mounted on said vehicle; and
    a shift lever for selecting a plurality of ranges of said automatic transmission, said plurality of ranges including a parking range;
    wherein said inhibition release signal output means includes means for outputting said inhibition release signal when said shift lever is selected into any of said plurality of ranges other than said parking range.

6. An operation control system according to claim 2, wherein said inhibition release signal output means includes means for outputting said inhibition release signal when a running state of said vehicle and a driving state of an engine of said vehicle individually come into predetermined states.

7. An operation control system according to claim 1, wherein said vehicle includes a plurality of doors, said system further comprising:
    a plurality of air bags including said first air bag;
    a plurality of collision sensors including said first collision sensor;
    a plurality of inflators including said first inflator; and
    a plurality of inhibit means including said first inhibit means;
    said plurality of air bags, said plurality of collision sensors, said plurality of inflators, and said plurality of inhibit means each being respectively disposed inside said plurality of doors of said vehicle.

8. An operation control system according to claim 2, wherein said inhibition release signal output means includes means for outputting said inhibition release signal when a shift lever of an automatic transmission of said vehicle is selected into a position other than a parking position.

* * * * *